(12) United States Patent
Cancedda et al.

(10) Patent No.: US 8,077,984 B2
(45) Date of Patent: Dec. 13, 2011

(54) METHOD FOR COMPUTING SIMILARITY BETWEEN TEXT SPANS USING FACTORED WORD SEQUENCE KERNELS

(75) Inventors: Nicola Cancedda, Grenoble (FR); Pierre Mahé, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1014 days.

(21) Appl. No.: 11/969,314

(22) Filed: Jan. 4, 2008

(65) Prior Publication Data

US 2009/0175545 A1 Jul. 9, 2009

(51) Int. Cl.
*G06K 9/36* (2006.01)
*G06F 17/20* (2006.01)

(52) U.S. Cl. .............................. 382/229; 380/290; 704/1

(58) Field of Classification Search .................. 382/181, 382/185, 190, 229, 197, 201, 202, 219, 290, 382/292, 293, 203; 704/3, 1, 9; 720/20, 720/1, 19; 707/E17.001, E17.033, E17.039, 707/999.002, E17.058, E17.061, E17.069, 707/E17.075, 999.004

See application file for complete search history.

(56) References Cited

U.S. PATENT DOCUMENTS

| | | | |
|---|---|---|---|
| 6,917,936 B2 | 7/2005 | Cancedda | |
| 7,058,567 B2 | 6/2006 | Ait-Mokhtar et al. | |
| 7,836,010 B2 * | 11/2010 | Hammond et al. | 707/705 |
| 7,933,906 B2 * | 4/2011 | Hammond et al. | 707/750 |
| 2005/0137854 A1 | 6/2005 | Cancedda et al. | |
| 2007/0265825 A1 | 11/2007 | Cancedda et al. | |

OTHER PUBLICATIONS

U.S. Appl. No. 11/341,788, filed Jan. 27, 2006, Segond, et al.
U.S. Appl. No. 11/378,708, filed Mar. 17, 2006, Roux, et al.
N.Cancedda, E.Gaussier, C.Goutte, J.M.Renders, Word-Sequence Kernels, *Journal of Machine Learning Research*, 3:1059-1082, 2003.
F.Costa, S.Menchetti, A.Ceroni, A.Passerini, P.Frasconi, Decomposition Kernels For Natural Language Processing, In *Proc. of the Workshop on Learning Structured Information in Natural Language Applications—EACL*, 2006.
C.Giuliano, A.Gliozzo, C.Strapparava, Syntagmatic Kernels: A Word Sense Disambiguation Case Study. In *Proc. of the Workshop on Learning Structured Information in Natural Language Applications—EACL*, 2006.
D.Haussler, Convolution Kernels on Discrete Structures, *Technical Report UCSC-CRL-99-10*, U.C., Santa Cruz, 1999. URL: http://www.cse.ucsc.edu/haussler/convolutions.ps.
P.Koehn, H.Hoang, Factored Translation Models, in *Proc. of the Joint Conference on Empirical Methods in Natural Language Processing and Computational Natural Language Learning*, pp. 868-876, Prague, 2007.
T.K.Landauer, P.W.Foltz, D.Laham, An Introduction to Latent Semantic Analysis, *Discourse Processes*, 25:259-284, 1998.
H.Lodhi, C.Saunders, J.Shawe-Taylor, N.Cristianini, C.Watkins, Text Classification Using String Kernels, *J. Mach. Learn. Res.*, 2:419-444, 2002. URL: http://www.ai.mit.edu/proiects/jmlr/papers/volume2/lodhi02a/abstract.html.

(Continued)

*Primary Examiner* — Sheela Chawan

(57) ABSTRACT

A computer implemented method and an apparatus for comparing spans of text are disclosed. The method includes computing a similarity measure between a first sequence of symbols representing a first text span and a second sequence of symbols representing a second text span as a function of the occurrences of optionally noncontiguous subsequences of symbols shared by the two sequences of symbols. Each of the symbols comprises at least one consecutive word and is defined according to a set of linguistic factors. Pairs of symbols in the first and second sequences that form a shared subsequence of symbols are each matched according to at least one of the factors.

24 Claims, 11 Drawing Sheets

OTHER PUBLICATIONS

K.Papineni, S.Roukos, T.Ward, W.J.Zhu, *Bleu: A Method for Automatic Evaluation of Machine Translation*, 2001. URL: citeseer.ist.psu.edu/papineni02bleu.html.

Ait-Mokhtar, et al., *Incremental Finite-State Parsing*, Proceedings of Applied Natural Language Processing, Washington, Apr. 1997.

S.Ait-Mokhtar, J.P.Chanod, C.Roux, Robustness Beyond Shallowness: Incremental Deep Parsing, *Nat. Lang. Eng.*, 8(3):121-144, 2002. ISSN 1351-3249. doi: http://dx.doi.org/10/1017/S1351324902002887.

J.A.Bilmes, K.Kirchhoff, Factored Language Models and Generalized Parallel Backoff, in *NAACL '03: Proc. of the 2003 Conference of the North American Chapter of the Association for Computational Linguistics on Human Language Technology*, pp. 4-6, Morristown, NJ, USA, 2003. Association for Computational Linguistics. doi: http://dx.doi.org/10.3115/1073483.1073485.

P.F.Brown, S.A.Della Pietra, V.J.Della Pietra, R.L.Mercer, The Mathematics of Statistical Machine Translation: Parameter Estimation. *Computational Linguistics*, 19(2):263-311, 1993.

C.Cortes, P.HAFFNERr, M.Mohri, Rational Kernels: Theory and Algorithms, *J. Mach. Learn. Res.*, 5:1035-1062, 2004. ISSN 1533-7928.

G.R.G.Lanckriet, N.Cristianini, M.I.Jordan, W.S.Noble, Kernel-Based Integration of Genomic Data Using Semidefinite Programming, In B. Scholkopf, K. Tsuda, and J.P. Vert, editors, *Kernel Methods in Computational Biology*, pp. 231-259, MIT Press, 2004.

J.Shawe-Taylor, N.Cristianini, *Kernel Methods for Pattern Analysis*, Cambridge University Press, 2004.

Ait-Mokhtar, et al., *Subject and Object Dependency Extraction Using Finite-State Transducers*, Proceedings ACL'97 Workshop on Information Extraction and the Building of Lexical Semantic Resources for NLP Applications, Madrid, Jul. 1997.

C.Leslie, R.Kuang, Fast String Kernels Using Inexact Matching for Protein Sequences, *J. Mach. Learn. Res.*, 5:1435-1455, 2004.

F.J.Och, D.Gildea, S.Khudanpur, A.Sarkar, K.Yamada, A.Fraser, S.Kumar, L.Shen, D.Smith, K.Eng, V.Jain, Z.Jin, D.Radev, A Smorgasbord of Features for Statistical Machine Translation. In *Proc. of the 2004 Meeting of the North American Chapter of the Association for Computational Linguistics (NAACL-04)*, 2004.

F.J.Och, H.Ney, Discriminative Training and Maximum Entropy Models for Statistical Machine Translation, in *ACL '02: Proc. of the 40th Annual Meeting on Association for Computational Linguistics*, pp. 295-302, Morristown, NJ, USA, 2001.

B.Roark, M.Saraclar, M.Collins, M.Johnson, Discriminative Language Modeling With Conditional Random Fields and the Perceptron Algorithm, in *ACL '04: Proc.of the 42"d Annual Meeting on Association for Computational Linguistics*, p. 47, Morristown, NJ, USA, 2004.

L.Shen, A.Sarkar, F.J.Och, Discriminative Reranking For Machine Translation, In *Proc. of HLTNAACL.*, 2004.

J.Weston, B.Schlkopf, E.Eskin, C.Leslie, W.S.Noble, Dealing With Large Diagonals in Kernel Matrices. *Annals of the Institute of Statistical Mathematics*, 55(2):391-408, Jun. 2003 (Abstract).

C.Saunders, H.Tschach, J.Shawe-Taylor, Syllables And Other String Kernel Extensions, *In ICML '02: Proc. of the Nineteenth International Conference on Machine Learning*, pp. 530-537, San Francisco, CA, USA, 2002. Morgan Kaufmann Publishers Inc. ISBN 1-55860-873-7.

\* cited by examiner

METHOD FOR COMPUTING SIMILARITY BETWEEN TEXT SPANS USING FACTORED WORD SEQUENCE KERNELS

The exemplary embodiment relates to an apparatus and method for computing a similarity measure between spans of text.

In many language-related applications, it is desirable to have a method for measuring the similarity of text spans. The text spans comprise sequences of tokens, such as words, and may be phrases, sentences, paragraphs, and even entire documents. Examples of the applications where such a method is applicable including text categorization, retrieval, clustering, filtering, automatic evaluation, and language modeling for both automatic speech recognition and statistical machine translation. For example, in the machine translation of a sentence from a one language to another language, the quality of the translated sentence may be assessed by computing a similarity measure between the translated sentence (source sequence) and a set of stored sentences (target sequences) in the same language. The stored sentences may have been previously evaluated and determined to be good by an experienced translator, in terms of their grammar, construction, and the like. Similarly, in speech recognition, it is desirable to assess the accuracy of a text sequence which has been transcribed from speech to text.

Many natural language processing (NLP) tasks can be performed using machine learning algorithms that require a vector space representation of text documents to be defined. One way to generate such a representation is to introduce a dimension in the vector space for each possible sequence of a limited number of words in the text document, and to define the coordinates of the text document in this vector space from the number of occurrences of the different word sequences. The dimensionality of this type of vector space is very high, but in many cases it is sufficient to be able to compute dot-products between the vector representations of documents, without explicitly storing the vectors themselves.

Recently, efficient algorithms have been developed to jointly map texts and compute their pairwise dot-products in such high dimensional vector spaces using kernel functions. The term "kernel function" denotes a class of functions computing dot-product between objects mapped to particular vector spaces. More generally, kernel functions correspond to similarity measures having specific mathematical properties ensuring their equivalence to particular dot products. As a result, in conjunction with various methods for employing kernel functions such as, for instance, the support vector machine algorithm, a variety of NLP tasks, including text categorization, named entity recognition or word semantic disambiguation, have been improved.

Sequence kernels (also referred to as string kernels) have been developed for measuring the similarity between two sequences of symbols over the same alphabet, where similarity is assessed as the number of occurrences of (possibly noncontiguous) subsequences shared by the two sequences of symbols; the more subsequences in common, the greater the measure of similarity between the two sequences of symbols. Noncontiguous occurrences of subsequences are penalized, e.g., according to the number of gaps they contain. In general, the symbols in NLP applications are words and the sequences are contiguous sequences of words, such as sentences, paragraphs, and the like. For most applications, the alphabet thus comprises a set of words in a selected natural language, such as English.

Because the sequence kernel generally requires an exact match between the symbols in the two subsequences that are being compared, many sequences that could usefully be used in assessing the quality of a machine translation are ignored.

There remains a need for a method of computing the similarity of text sequences which allows acceptable differences between two tokens to factor into the computation.

INCORPORATION BY REFERENCE

The following references, the disclosures of which are incorporated herein in their entireties by reference, are mentioned:

U.S. Pub. No. 2005/0137854, published Jun. 23, 2005, entitled METHOD AND APPARATUS FOR EVALUATING MACHINE TRANSLATION QUALITY, by Nicola Cancedda, et al., discloses a method for assessing the quality of machine translation of natural language by computing a sequence kernel that provides a measure of similarity between a first sequence of symbols representing a machine translation in a target natural language and a second sequence of symbols representing a reference translation in the target natural language. The measure of similarity takes into account the existence of non-contiguous subsequences shared by the first sequence of symbols and the second sequence of symbols. When the similarity measure does not meet an acceptable threshold level, the translation model of the machine translator may be adjusted to improve subsequent translations performed by the machine translator.

U.S. Pat. No. 6,917,936, issued Jul. 12, 2005, entitled METHOD AND APPARATUS FOR MEASURING SIMILARITY BETWEEN DOCUMENTS, by Nicola Cancedda, discloses a method for computing a measure of similarity between two sequences of symbols as a string kernel.

U.S. Pub. No. 2007/0265825, published Nov. 15, 2007, entitled MACHINE TRANSLATION USING ELASTIC CHUNKS, by Nicola Cancedda, et al., discloses a machine translation method which includes receiving source text in a first language and retrieving text fragments in a target language from a library of bi-fragments to generate a target hypothesis. Each bi-fragment includes a text fragment from the first language and a corresponding text fragment from the second language. Some of the bi-fragments are modeled as elastic bi-fragments where a gap between words is able to assume a variable size corresponding to a number of other words to occupy the gap. The target hypothesis is evaluated with a translation scoring function which scores the target hypothesis according to a plurality of feature functions, at least one of the feature functions comprising a gap size scoring feature which favors hypotheses with statistically more probable gap sizes over hypotheses with statically less probable gap sizes.

BRIEF DESCRIPTION

In accordance with one aspect of the exemplary embodiment, a method of comparing spans of text includes computing a similarity measure between a first sequence of symbols representing a first text span and a second sequence of symbols representing a second text span as a function of the occurrences of optionally noncontiguous subsequences of symbols shared by the two sequences of symbols. Each of the symbols comprises at least one consecutive word. The words are enriched with linguistic information allowing them to be defined according to a set of linguistic factors. Pairs of symbols in the first and second sequences that form a shared subsequence of symbols are each matched according to at least one of the factors and wherein all pairs of matching symbols in a shared subsequence need not match according to the same factor.

In accordance with another aspect, an apparatus for computing a similarity measure between sequences of symbols in which each symbol is defined in terms of a plurality of factors includes a linguistic processor which takes as input a text span and enriches tokens of the text span with linguistic information to form a first sequence of symbols, each of the symbols comprising an enriched token. A sequence kernel computation unit takes as input the first sequence of symbols and computes a similarity measure between the first sequence of symbols and a second sequence of symbols as a function of the occurrences of optionally noncontiguous subsequences of symbols shared by the first and second sequences of symbols, whereby pairs of symbols in shared subsequences of symbols shared by the first and second sequences are each independently matched according to any one or more of the factors based on the linguistic information.

In accordance with another aspect, a method of computing a similarity measure between sequences of symbols in which each symbol is defined in terms of a plurality of factors is provided. The method includes computing a sequence kernel in which optionally non-contiguous subsequences of the first and second sequences are compared, the kernel having the general form:

$$K_n(s, t) = \sum_{I,J} \lambda^{l(I)+l(J)} \prod_{k=1}^{n} A(s_{i_k}, t_{j_k})$$

where:

s and t represent the first and second sequences;

n represents a length of the shared subsequences to be used in the computation;

I and J represent two of the subsequences of size n of indices ranging on the positions of the symbols in s and t respectively;

$\lambda$ represents an optional decay factor which weights gaps in non-contiguous sequences;

l(I) represents the length, as the number of symbols plus any gaps, spanned by the subsequence I in s;

l(J) represents the length, as the number of symbols plus any gaps, spanned by the subsequence J in t, respectively; and $A(s_{i_k}, t_{j_k})$ is a function of two symbols $s_{i_k}, t_{j_k}$ in the sequences s and t respectively, the function quantifying the similarity between the two symbols according to the set of factors.

DETAILED DESCRIPTION

Figure 1:
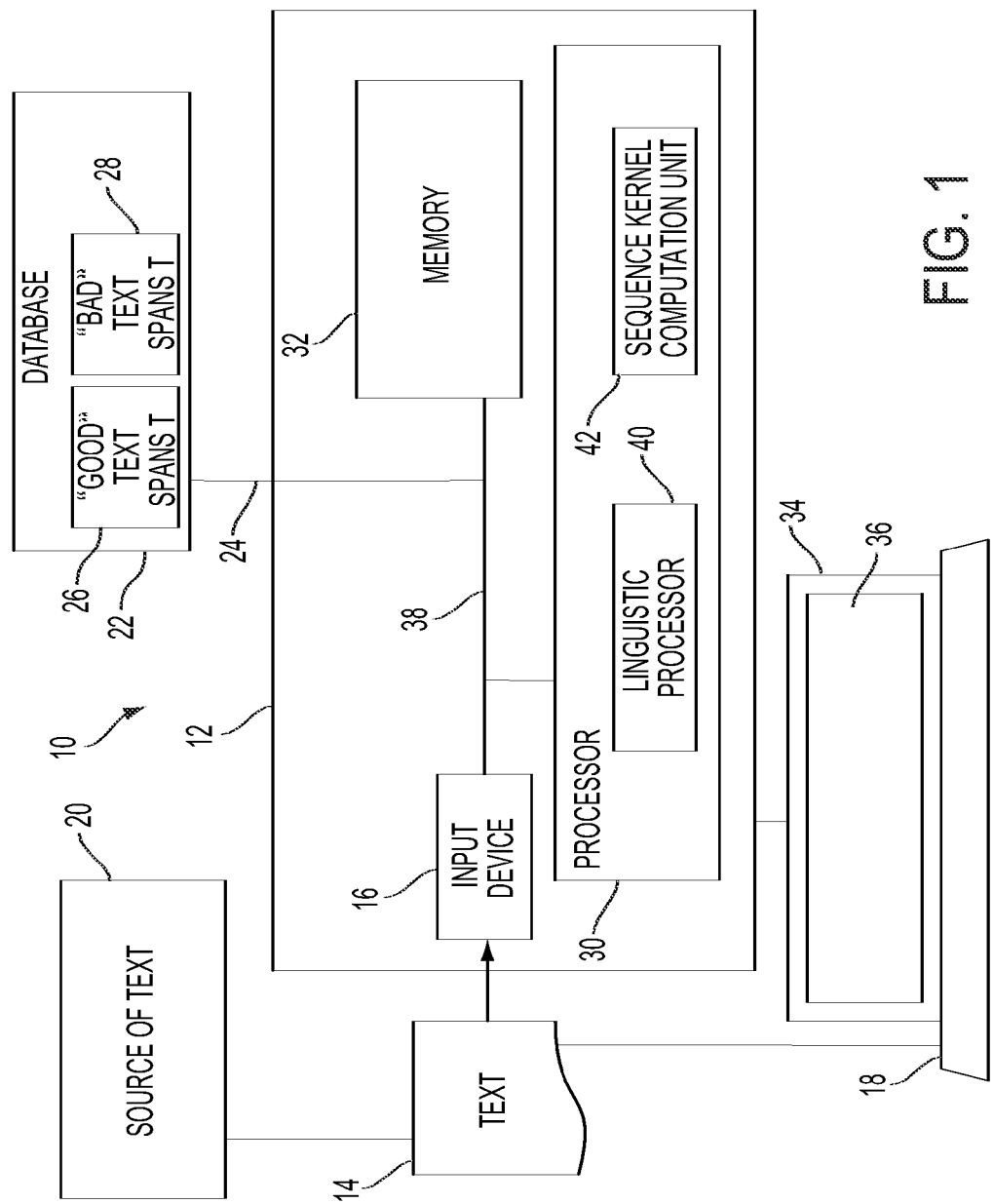
FIG. 1 is a functional block diagram of an apparatus for comparing the similarity of sequences of text.

In the following description a sequence kernel is described for computing a similarity measure between spans of text. The exemplary sequence kernel is a factored word-sequence kernel (fwsk) which considers a plurality of linguistic factors in computing the similarity measure. The factors enable non-identical tokens (generally words) to be considered similar for purposes of the computation, such as words with the same lemma (which, as used herein may refer to a root form and/or word stem) and words which are identified with the same part of speech (POS).

The fwsk is an extension of the class of text kernels that are based on word-sequences that allows the introduction of various linguistic resources, such as, for instance, word lemmas and parts of speech, in the text encoding process, at little extra computational cost. Besides providing a general way to combining multiple knowledge sources, the class of kernel functions disclosed can detect long range interactions between words.

The exemplary fwsk is symmetric and positive definite, and is thus a true kernel in accepted Machine Learning terminology. While it is formally similar to other word-sequence kernels, and has similar computational properties, it can leverage linguistic knowledge sources to produce more accurate measures. The exemplary factored word-sequence kernel finds application in a method and an apparatus for computing similarity between text spans. For example, in one embodiment, the kernel is employed in a system and method for evaluating machine translation quality. Such a system and method are described, for example, in above-mentioned U.S. Pub. No. 2005/0137854, incorporated by reference. By expanding the range of text sequences which are likely to be found to be similar, the exemplary method provides a more accurate method for scoring fluency of a machine translation, with respect to a given language, by assessing whether a candidate translated or transcribed text sequence qualifies as a good translation in the target language. The exemplary fwsk may be used to evaluate the similarity between different types of sequences of symbols such as sequences of: characters, words, lemmas, or other predefined sets of terms (e.g., speech samples). By introduction of additional linguistic resources that can further account for the syntactic and morphological structure of texts, the proposed kernel construction can have a great impact on a number of applications which rely on the computation of text-span similarity.

As with existing sequence kernels, the present sequence kernel provides a measure of similarity between two sequences of symbols over the same alphabet, where similarity is assessed as the number of occurrences of (optionally noncontiguous) subsequences shared by the two sequences of symbols. The more subsequences in common, the greater the measure of similarity between the two sequences of symbols. The noncontiguous occurrences of subsequences may be penalized according to the number of gaps (non-matching symbols) they contain.

In the exemplary embodiment, symbols of a shared subsequence which match in accordance with at least one of a plurality of the factors used in computing the similarity measure thus have a positive contribution to the similarity measure. The match can be binary (e.g., 1 for an exact match, or 0 for no match) or a less discrete value.

The sequences to be compared represent spans of text, such as sentences, paragraphs, or entire documents, which have been enriched with linguistic information related to the factors being considered. Each symbol to be compared is thus a composite object comprising a word together with the linguistic information. Generally, the symbols forming the alphabet and which make up the sequences are words or, in some cases, short sequence of words. It will be appreciated that the exact structure of the words recognized in a given sequence is a function of the NLP software used in splitting (or "tokenizing") the text span into a sequence of tokens. The symbols each include a respective token. Each symbol in a shared subsequence has a surface form. This is the form in which the word (or more strictly, the token) appears in the sequence.

The exemplary embodiment is described in terms of three factors which are used in computing the similarly measure: the surface form, the lemma form, and the part of speech (POS) of the symbol. However, it is to be appreciated that fewer or more than these factors may be employed and/or that a different set of factors may be considered. In the exemplary embodiment each factor is weighted in the overall kernel computation. The factors may be accorded the same weights or different weights.

Each symbol has, as its surface form, generally no more than a single word. In some embodiments, some of the symbols may each have, as a surface form, a plurality of words. In other embodiments, some of the symbols may correspond to other characters, such as punctuation, common ascii characters, and the like. Each symbol is also assigned a lemma form (root form), which may be different from the surface form. Each lemma form may thus be assigned to more than one word. For example, the words come, comes, coming, etc. may all be assigned the same lemma. Each symbol is further assigned a part of speech (POS), based on its determined usage in the sequence under consideration. The assigned part of speech may be selected from a limited set of predefined different parts of speech, such as noun, verb, adjective, adverb, and the like. In one embodiment, a single POS is assigned, e.g., the most probable. Alternatively, more than one POS may be assigned, each POS accompanied by a probability, or other soft weighting. In one embodiment, the POS may include a syntactic component, such as object, subject, or the like, depending on the context in which it is used in the sequence. As will be appreciated, each symbol in the alphabet may have more than one possible lemma form and more than one possible POS. For example, in a given sequence, the word can may be assigned a POS of noun or verb and, based on that assignment, may have one of two or more different lemma forms assigned to it.

The alphabet may be different for each factor, thus the alphabet for surface forms may include only the surface forms of the symbols, whereas the alphabet for lemmas includes all the recognized lemma forms and the POS alphabet, the set of recognized POSS.

Each sequence under consideration generally corresponds to a span of text, within which subsequences can be identified. As with previous methods, a subsequence of symbols generally includes a preselected number of symbols in the same order as in the sequence and optionally including one or more gaps, each gap corresponding to one or more symbols. However, as discussed above, an exact match between surface forms of pairs of symbols in the subsequences is not required.

With reference to FIG. 1, a functional block diagram of an automated apparatus 10 for computing a similarity measure between first and second text spans in a common natural language, such as English or French is shown. The apparatus 10 is embodied in a computing device 12. Text 14 is input to the apparatus via an input device 16. The text 14 may include one or more text spans, such as sentences, paragraphs, or an entire document comprising multiple paragraphs.

The input text 14 may be directly input into the apparatus 10 (for example, as with a person typing sentences into a computer using a keyboard 18). Alternatively, the input text may be the output of a source of text 20, such as, for example, a translation system, a speech recognition system (for example, speech input device) or an optical character recognition system. In one embodiment some or all of the text may be input from a database 22. The database may be stored in the computing device 12 or may be linked thereto via a wired or wireless link 24. In the exemplary embodiment, the database stores two sets of preprocessed text spans 26, 28 (e.g., sentences) which have each been enriched with linguistic information relevant to one or more of the factors used in computing the sequence kernel and optionally have been further classified as being either "good" or "bad" text spans for the language under consideration.

The apparatus 10 may be embodied in a combination of software and hardware and includes a processing component 30 or CPU which executes instructions, stored in associated memory 32, for performing the method described in further detail with reference to FIG. 2. During processing input text spans to be compared may be stored in memory 32 or in a separate memory. The memory 32 may include, for example, read only memory (ROM), random access memory (RAM), flash memory, or any combination of the above as a single component or distributed components. It will be appreciated that computing device 12 may be controlled by operating system software which includes a file management system, such as, for example, a disk operating system, which is part of the operating system software. The file management system may be stored in a non-volatile memory storage device, such as memory 32, and may be configured to cause processing component 30 to execute the various functions required by the operating system to input and output data and to store data in volatile memory 32. A user input/output device 34 in communication with the apparatus 10 can include one or more of an input device, such as keyboard 18, touch screen, or cursor control device, and an output device, such as a display 36, printer, or the like. Components of the apparatus may be linked by a data/control bus 38.

The illustrated processing component 30 includes a linguistic processor 40, such as a parser and a sequence kernel computation unit 42. The linguistic processor 40 takes an input, each text span of input text 14 and enriches the text span with linguistic information to form a sequence s of symbols. In particular, the linguistic processor 40 first tokenizes the input text span and outputs an ordered sequence of tokens. The linguistic processor enriches each of the tokens with linguistic information, such as its identified part of speech and its lemma form, morphological information which identifies the token as a particular number, gender, case, mood, transitivity and/or tense. Morphological information may also include linguistic information relating to one or more word clustering categories, such as synonyms, metonyms, meronyms, hypernyms, antonyms, and the like, allowing words to be matched if they are linked to each other according to one or more of these clustering classes. This linguistic information may be retrieved from a suitable thesaurus. The linguistic information may be incorporated as meta data, XML tags, or the like. For example, it may be useful to find a similarity between two subsequences "open the door" and "close the door" which would be realized with an appropriately weighted antonym factor.

The sequence kernel computation unit 42 takes as input the enriched text span and computes a similarity measure (e.g., the exemplary factored word sequence kernel) between the enriched text span (sequence s of symbols) and a second, similarly enriched text span, such as one of the previously enriched "good" or "bad" sequences t stored in database 22. The sequence kernel computation unit 42 may compute similarity measures between sequence s and each of a large number of the good and bad sequences t and, based on the computed similarity measures, outputs an overall determination of the quality of the input text span, represented by sequence s. The determination may be as simple as "good" (e.g., if there is a higher similarity measure, on average, for good text spans t than for the bad ones) or "bad" (e.g., if there is a higher similarity measure, on average, for bad text spans t than for the good ones). Alternatively, the determination is expressed in terms of a probability of being good or bad.

The linguistic processor 40 may be an incremental parser, such as the Xerox Incremental Parser (XIP) as described, for example, in above-referenced U.S. patent application Ser. Nos. 11/378,708 and 11/341,788; U.S. Pat. No. 7,058,567; Aït-Mokhtar, et al., "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL '97 Workshop on Information Extraction and the Building of Lexical Semantic Resources for NLP Applications, Madrid, July 1997. Alternatively, the linguistic processor 40 may be a less sophisticated processor which is configured for performing the linguistic processing steps required for the exemplary method.

The exemplary apparatus 10 may be hosted by one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used as the computing device 12 which hosts the apparatus 10.

Figure 2:
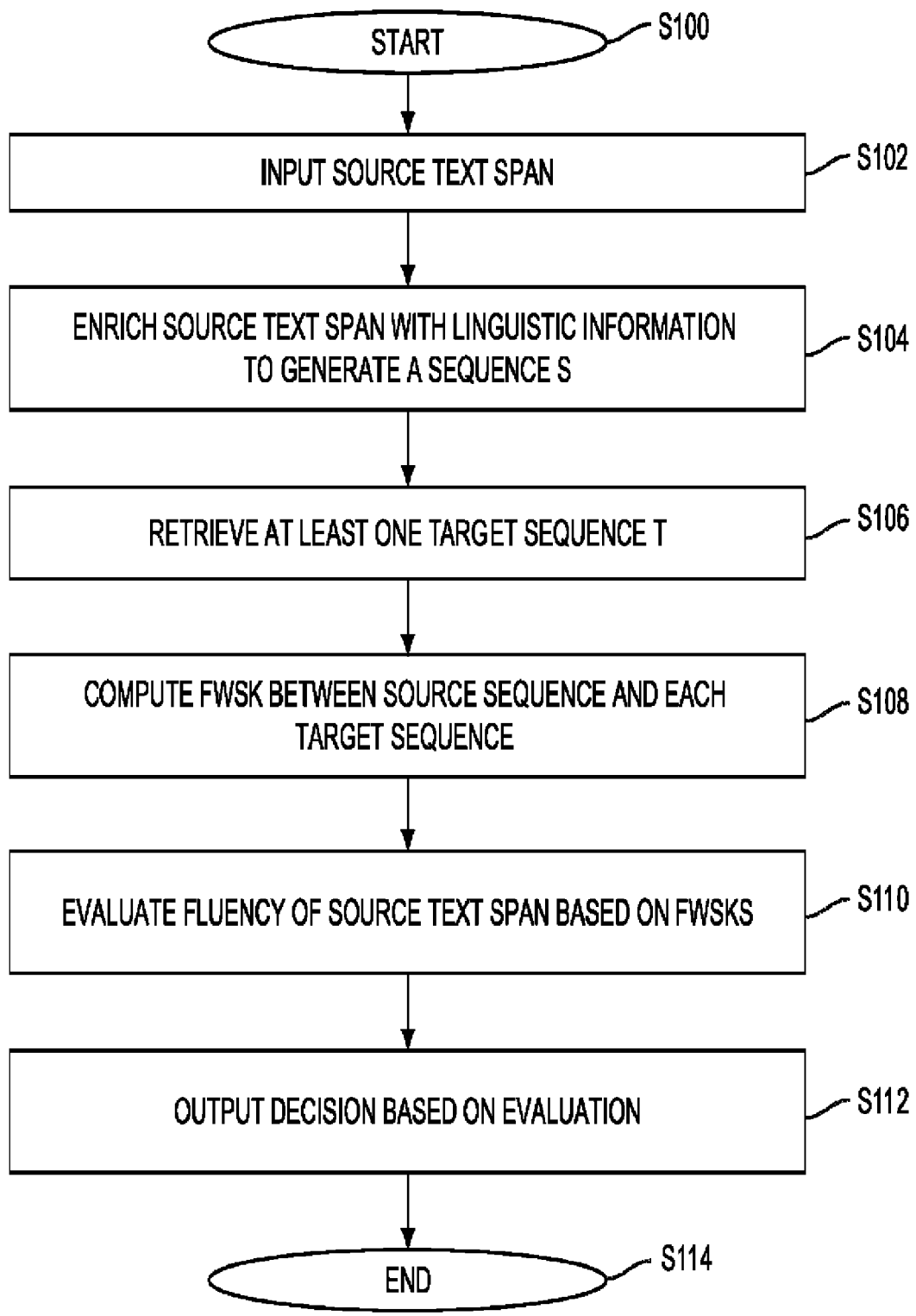
FIG. 2 illustrates a method for comparing the similarity of sequences of text.

FIG. 2 illustrates an exemplary method for computing the similarity between text spans. In general, the method compares a first text sequence (source sequence) e.g., a text sequence obtained by enriching a text span from a machine translation or transcription, with one or more second sequences (target sequences), such as one or more of the reference sequences stored in the database. In the exemplary embodiment, the reference sequences are already enriched with linguistic information.

The method begins at S100. At S102, a source text span to be compared is retrieved, for example, from a statistical machine translation of a document or transcribed speech.

At S104, the source text span is processed using automated NLP techniques. In general, the source text span is first broken down into a sequence of tokens, which are typically words. Each token is assigned one or more parts of speech. Disambiguation techniques may be used to identify and discard less probable parts of speech, based on context. A lemma form is assigned to each of the tokens based on the surface form and the identified context of the word in the text span. Each token, together with its associated POS and lemma, serves as a symbol.

At S106, a target sequence which is to be compared with the source sequence is retrieved. In the exemplary embodiment, the target sequence is retrieved from a database of reference sequences and has already been NLP processed in a similar manner to identify the POS and lemma for each symbol in the sequence. In other embodiments, the target sequence may be NLP processed upon retrieval.

At S108, a fwsk is computed by comparing subsequences of the source sequence with the target sequence, as described in greater detail below. The fwsk outputs a similarity measure between the source sequence and the target sequence. In general, the greater the computed similarity, the higher the value of the output similarity measure. In one embodiment, a plurality of fwsks are computed, each for a different subsequence length and combined into an overall similarity measure.

Steps S106 and S108 may be repeated for a set of target sequences. At S110, an evaluation is made as to whether the source sequence is a fluent translation, based on a combined score of the similarity measures output for the set of target sequences. If the target sequences are all sequences which are considered to be good translations, then the combined score generally increases with fluency, whereas where the target sequences are poor translations, a high score indicates that the source sequence is not a good translation. At S112, a decision may be output for a user, based on the evaluation, such as whether or not the input sequence is fluent. The method ends at S114.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The theory behind the exemplary sequence kernel will now be described in greater detail.

Language Modeling

This section sets forth basic notations and definitions for the mathematical framework of the sequence kernel that is used to compute a measure of similarity between sequences of symbols s (e.g., a target sequence) and t (e.g., a reference sequence). The notation set forth in this section is also used to describe extensions disclosed below in section 3. To provide a background, a gap-weighted sequence kernel is first described, followed by a description of how such a kernel can be adapted to accommodate a plurality of factors, such as the three factors described above.

1. Gap-weighted Sequence Kernels

This section describes the class of kernel functions that are relied on, which are referred to as gap-weighted sequence kernels (see, for example, U.S. Pub. No. 2005/0137854 for a fuller description of such kernels). The gap-weighted kernel function accommodates gaps of one or more symbols in either the source or target sequence, or both. A gap weighting function (decay function) in the sequence kernel weights the similarity measure according to the number of gaps. In general, as the number of gaps increases, the weighting function rapidly causes the similarity measure to diminish towards zero.

1.1 Original Formulation

Let $\Sigma$ be a finite alphabet of symbols, and $s=s_1 s_2 \ldots s_{|s|}$ a sequence of symbols over $\Sigma$ (i.e., $s_i \in \Sigma, 1 \leq i \leq |s|$). In the following description, particular reference is made to sentences, or more generally, word-sequences. The alphabet $\Sigma$ is thus a set of words or word-related features, not a set of characters. As previously noted, a sequence can be a sentence or multiple sentences, paragraphs, or an entire document.

Let $I=[i_1, i_2, \ldots, i_n]$ with $1 \leq i_1 < i_2 < \ldots i_n \leq |s|$ be a subset of the indices in s. The indices represent the position of a given symbol in the sequence s, e.g., as determined from the first (or last) word in the sequence. The expression $s[I] \in \Sigma^n$ will be used to represent the subsequence $s_{i_1} s_{i_2} \ldots s_{i_n}$. Note that s[I] does not necessarily form a contiguous subsequence of s. For example, if s is the sequence He came to London and i=[2,4], then s[I] is: came London.

Let l[I] represent the length (number of symbols plus any gaps) spanned by the subsequence s[I] in s, that is: $l[I]=i_n-i_1+1$.

Assuming the above sequence s is the source sequence, similar expressions can be used for a target sequence t. For example, let J represent a subset of the indices in t, i.e.: $J=[j_1, j_2, \ldots, j_n]$ and l[J] therefore represents the length (number of symbols plus any gaps) spanned by the subsequence t[J] in t, that is: $l[J]=j_n-j_1+1$. The sequence kernel of two sequences s and t over $\Sigma$ can then be defined as:

$$K_n(s,t) = \sum_{u \in \Sigma^n} \sum_{I:s[I]=u} \sum_{J:t[J]=u} \lambda^{l(I)+l(J)} \qquad (1)$$

where $\lambda \in [0;1]$ is a decay factor used to penalize non-contiguous subsequences and the first sum refers to all possible subsequences u of length n symbols (i.e., not counting any gaps between the symbols). As can also be seen from Eqn. 1, as the length of either one or both of the subsequences increases (due to the presence of gaps), the value of the sequence kernel tends to diminish, since $\lambda$ has a value which is less than 1. Equation (1) defines a valid kernel as it amounts to performing an inner product in a feature space with one feature per ordered subsequence $u \in \Sigma^n$ with value:

$$\phi_u(s) = \sum_{I:s[I]=u} \lambda^{l(I)} \qquad (2)$$

Figure 3:
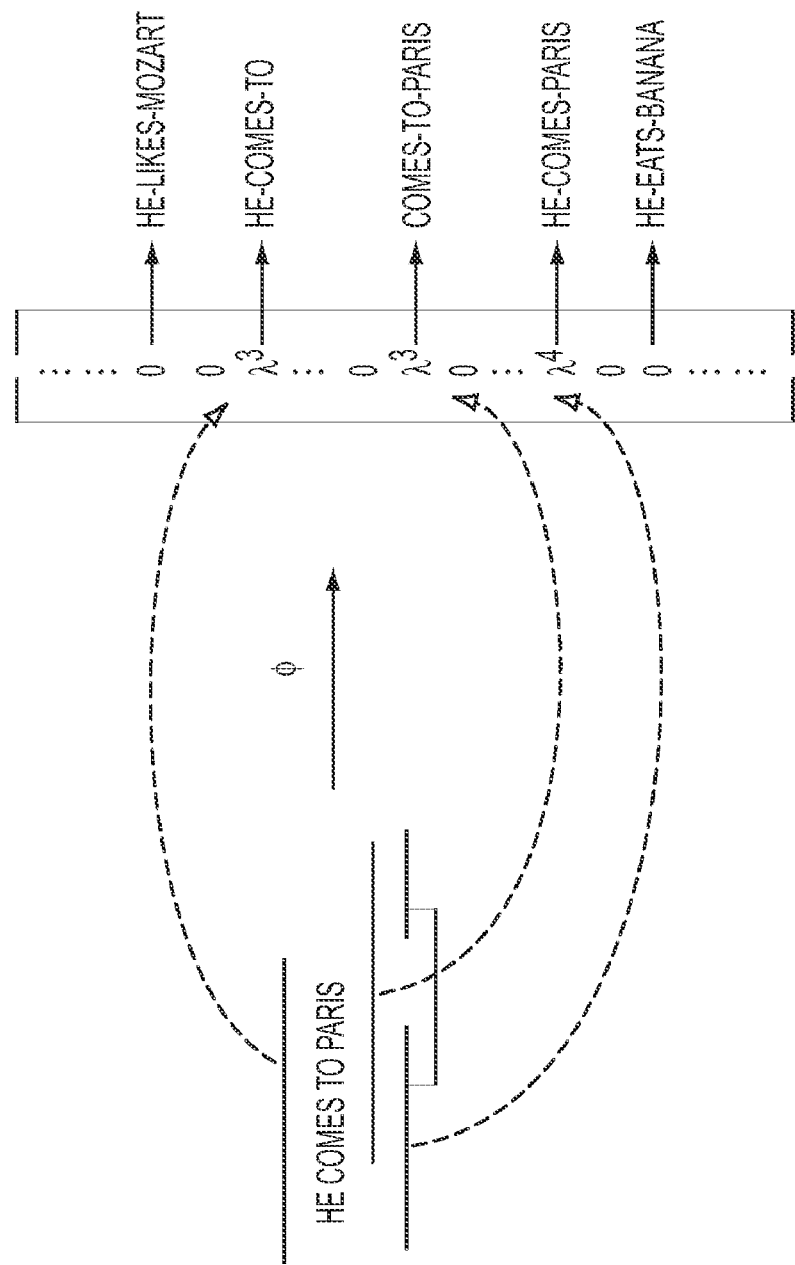
FIG. 3 illustrates the treatment of gaps in subsequences that are shared over first and second sequences.

Intuitively, this means that all possible subsequences of n symbols are matched, even when these subsequences are not consecutive, and with each occurrence "discounted" according to its overall length (FIG. 3).

A direct computation of all the terms under the nested sum in (1) becomes impractical even for small values of n. In addition, it is advantageous to calculate $K_n(s,t)$ directly rather than perform an explicit expansion in feature space. This can be done using a recursive formulation which leads to a more efficient dynamic-programming-based implementation (e.g., based on methodology proposed for sequences of letters in H. Lodhi, C. Saunders, J. Shawe-Taylor, N. Cristianini, and C. Watkins. *Text classification using string kernels*, J. Mach. Learn. Res., 2:419-444 (2002), hereinafter Lodhi et al.). This formulation has complexity $O(n|s||t|)$ both in time and space. Another implementation which has same time complexity but $O(n(|s|+|t|))$ space complexity is described, for example in U.S. Pat. No. 6,917,936 to Cancedda, the disclosure of which is incorporated herein by reference in its entirety.

By way of example, FIG. 3 illustrates the feature space mapping associated with a kernel according to Eqn. (1) for N=3. Note that because there is a gap included in the subsequence he-comes-Paris, this subsequence is associated with a weight $\lambda$ times bigger than one of contiguous subsequences.

1.2 Soft-matching Formulation

The kernel defined in Equation 1 can also be written as:

$$K_n(s,t) = \sum_{u \in \Sigma^n} \left( \sum_{I:s[I]=u} \sum_{J:t[J]=u} \lambda^{l(I)+l(J)} \right) \qquad (3)$$

$$= \sum_{I,J:s[I]=t[J]} \lambda^{l(I)+l(J)} \qquad (4)$$

$$= \sum_{I,J} \lambda^{l(I)+l(J)} \delta(s[I], t[J]) \qquad (5)$$

$$= \sum_{I,J} \lambda^{l(I)+l(J)} \prod_{k=1}^{n} \delta(s_{i_k}, t_{j_k}) \qquad (6)$$

where:

the summation is over all possible subsequences defined by I and J and the product $\prod_{k=1}^{n} \delta(s_{i_k}, t_{j_k})$ explicitly checks whether sequences s[I] and t[J] are identical or not. Soft-matching between sequences can be obtained by replacing the product $\prod_{k=1}^{n} \delta(s_{i_k}, t_{j_k})$ by a product $\prod_{k=1}^{n} A(s_{i_k}, t_{j_k})$, where A is a positive-definite similarity measure between a pair of sequence symbols. (Note in particular that if the similarity matrix A is not positive-definite, the sequence kernel obtained at order n=1 is not a valid kernel function.) The sequence kernel thus becomes:

$$K_n(s,t) = \sum_{I,J} \lambda^{l(I)+l(J)} \prod_{k=1}^{n} A(s_{i_k}, t_{j_k})$$

In which I and J represent two sets of size n of indices ranging on the positions of the symbols in s and t respectively, and in strictly increasing order.

Note that, in general, this kernel formulation does not have an explicit feature space interpretation.

2 Factored Kernel

A factored sequence kernel in accordance with the exemplary embodiment will now be described.

2.1 Definition

In the sequence kernel of N. Cancedda, E. Gaussier, C. Goutte, and J.-M. Renders, Word-sequence Kernels, *Journal of Machine Learning Research*, 3:1059-1082 (2003), hereinafter "Cancedda, et al., 2003," a word is described in terms only of its surface form. The exemplary embodiment assumes that a word can be characterized by a plurality of factors. In one embodiment, it is assumed that a word (i.e., a symbol in the above notation) can be characterized not only by its surface form, as is the case in Cancedda, et al., 2003, but also by one or more additional factors, such as its lemma and/or part of speech. More generally, consider the case where a word u (or v) can be represented by a set of p factors $\{u[h]\}_{h=1:p}$, where h is a an index of the factors ranging from 1 to p.

In this case, a simple and natural way to introduce a soft-matching between words is to define the (positive-definite) similarity measure A introduced in Section 1.2 as a linear combination of kernel functions $k_h$ expressed on the different factors, that is, for the pair of words (u, v), as:

$$A(u, v) = \sum_{h=1}^{p} w_h^2 k_h(u[h], v[h]) \quad (7)$$

where the weights in the combination are squared in order to ensure the positive definiteness of the matrix A.

In this section, the particular case where the factors characterizing the words are discrete by nature will be considered. This is the case for the following factors: 1) surface forms, 2) lemmas (roots or stems), 3) parts of speech, and 4) morphological tags for one or more of number, gender, case, mood, transitivity and tense. The kernels $k_h$ can then be defined as a set of Kronecker delta functions. The word similarity measure A is therefore defined for the pair of words (u, v) as:

$$A(u, v) = \sum_{h=1}^{p} w_h^2 \delta(u[h], v[h]),$$

which leads to the following sequence kernel:

$$K_n(s, t) = \sum_{I,J} \lambda^{l(I)+l(J)} \prod_{k=1}^{n} \left( \sum_{h=1}^{p} w_h^2 \delta(s_{i_k}[h], t_{j_k}[h]) \right) \quad (8)$$

that is referred to herein as a factored word-sequence kernel or fwsk. Note that this equation is similar to the conventional kernel of Eqn. (1) as reformulated in Eq. (6), but takes into account a plurality of factors (e.g., two, three, or more factors).

As previously noted, s and t represent the two sequences, whose similarity are to be computed. $K_n(s,t)$ represents the computed similarity measured at a given value of n, where n represents the length of subsequences being compared. n can be, for example, in the range of from 2 to about 4. In the exemplary method, higher values of n may be impractical as, although increasing precision, they tend to reduce accuracy since there are increasingly fewer such subsequences in the database on which to base a fluency decision. Further, the larger the value of n, the longer it takes to compute the similarity measure. However, with a larger database of target sequences, higher values of n may be practicable. λ represents the decay factor, where $0<\lambda<1$. An appropriate value of the decay factor λ can be determined empirically. Higher values of λ allow sequences to be considered similar even when there are a relatively large number of gaps in matching subsequences. In some applications, it may be advantageous to set λ close to 0 (heavily penalizing any gaps), for example, in assessing the fluency of a machine translated sentence where the sentence is being compared with a larger number of sentences. In other cases, such as document categorization, it may be advantageous to set λ closer to 1 so that a larger pool of documents can be considered similar and thus used in making the classification. In the limit, when λ is 1, every subsequence contributes meaningfully to the similarity measure.

I and J represent subsequences as sets of indices (positions), in s and t, respectively. In general l(I) represents the length (number of symbols plus any gaps) spanned by the n indices in s and l(J) represents the length spanned by the n indices in t. Thus, since $\lambda<1$, as l(I)+l(J) increases due to the presence of gaps, the value of $\lambda^{l(I)+l(J)}$ decreases and thus the contribution of a pair of matching subsequences to the overall $K_n(s,t)$ diminishes. However, it is to be appreciated that the gap weighting factor, which accounts for the presence of gaps, here represented by $\lambda^{l(I)+l(J)}$ may be differently computed. p represents the number of factors (3 in the exemplary embodiment). $w_h$ represents the weight of a given factor (here, the weight is squared in the sequence kernel, although in other embodiments, it need not be). The function $\delta(s_{i_k}[h], t_{j_k}[h])$ represents the similarity (e.g., a score of 0 or 1) between two symbols $s_{i_k}$ and $t_{j_k}$ in s and t respectively, for a given one of the factors (elsewhere, these are referred to as u and v for convenience). In the comparison, the symbols are compared in the same order as their indices. Thus the first symbol of the subsequence in s is compared with the first symbol of the subsequence in t, the second symbol of the subsequence in s is compared with the second symbol of the subsequence in t, and so forth up to the nth symbols.

In one embodiment, one or more of the factors is defined in terms of one of a finite set of elements. For example, in the case of parts of speech, the elements may include indefinite article, proper noun, verb, adjective, etc. A match is found only if there is a match between the two elements, leading to a binary decision (e.g., 1 for a match or 0 for no match). Expressed more generally, such a factor comprises elements of a countable set and the similarity of two symbols u and v in a pair of symbols is computed using the Kronecker delta function:

$$k_h(u[h], v[h]) = \delta(u[h], v[h]) = \begin{cases} 1 & \text{if } u[h] = v[h] \\ 0 & \text{otherwise} \end{cases}$$

In computing the overall sequence kernel $K_n$, a value of $k_h$ is determined for the pair of symbols u and v for each of the factors and the values are weighted and summed. Thus, for example, if the three factors are surface form, lemma, and part of speech, and the weights are 0.4, 0.4, and 0.2, respectively, a match on all three factors ($k_1=k_2=k_3=1$) results in a similarity between the two words of 1*0.4+1*0.4+1*0.2=1, whereas a match on the first and third factors only ($k_1=k_3=1$, $k_2=0$) results in a similarity of 0.6.

In another embodiment, rather than considering factors as discrete, one or more of the factors may be continuous. Section 4, by way of example, discusses the introduction of a continuous semantic factor.

2.2 Feature Space Interpretation

Other ways of expressing the sequence kernel of Eqn. (8) are contemplated. In one embodiment, the similarity across a plurality of factors is computed as the similarity between two symbols in vector space. Each symbol has a position in a multi-dimensional space having a dimension for each possible subsequence. The similarity is a function of the distance between the positions of the two symbols.

For example, consider a vector $H \in [1, \ldots, p]^n$, then the factored kernel of Equation (8) can be represented as:

$$K_n(s, t) = \sum_{I,J} \lambda^{l(I)+l(J)} \prod_{k=1}^{n} \left( \sum_{h=1}^{p} w_h^2 \delta(s_{i_k}[h], t_{j_k}[h]) \right) \quad (9)$$

$$= \sum_{I,J} \lambda^{l(I)+l(J)} \sum_{H} \left( \prod_{k=1}^{n} w_{h_k}^2 \delta(s_{i_k}[h_k], t_{j_k}[h_k]) \right), \quad (10)$$

where the factored combination of delta functions along the subsequences is simply expanded into an exhaustive evaluation. Going one step further, this equation can be represented as:

$$K_n(s, t) = \sum_{I,J} \lambda^{l(I)+l(J)} \sum_{H: s[I,H]=t[J,H]} \left( \prod_{k=1}^{n} w_{h_k}^2 \right) \quad (11)$$

where the product of delta function has been incorporated into the summation over H, so that it is now restricted to the entries for which the pairs of word factors $\{s_{i_k}[h_k], t_{j_k}[h_k]\}$ simultaneously match for k=1 to n. The summations over I, J and H can be merged the kernel expressed as:

$$K_n(s, t) = \sum_{\substack{I,J,H: \\ s[I,H]=t[J,H]}} \lambda^{l(I)+l(J)} \prod_{k=1}^{n} w_{h_k}^2. \quad (12)$$

Consider the dictionary as being represented by the expression $$\Sigma = \bigcup_{h=1}^{p} \Sigma_h,$$

defined as the union of the dictionaries $\Sigma_h$ related to the different factors. By analogy with the construction presented in Section 1.2, instead of comparing directly subsequences s[I,H] and t[J,H], the global summation can be decomposed as a summation over elements of $\Sigma^n$ to be detected in s and t:

$$K_n(s, t) = \sum_{u \in \Sigma^n} \left( \sum_{\substack{(I,H): \\ s[I,H]=u}} \sum_{\substack{(J,H): \\ t[J,H]=u}} \lambda^{l(I)+l(J)} \prod_{k=1}^{n} w_{h_k}^2 \right). \quad (13)$$

It is now straightforward to see that the factored kernel of Equation (8) corresponds to the dot-product:

$$K_n(s, t) = \langle \phi(s), \phi(t) \rangle, \quad (14)$$

with $$\phi(s) = (\phi_u(s))_{u \in \Sigma^n}$$

and $$\phi_u(s) = \sum_{\substack{(I,H): \\ s[I,H]=u}} \lambda^{l(I)} \prod_{k=1}^{n} w_{h_k}.$$

This last equation shows that, due to its particular form of soft-matching between words, the factored kernel explicitly corresponds to a dot-product in a feature space indexed by the elements of $\Sigma^n$. It therefore bears a strong similarity with the original word-sequence kernel outlined in Cancedda, et al., 2003. The striking difference lies in the fact that the dictionary, usually defined from the surface forms of the words, is expanded in order to include other sources of information such as lemmas, part of speech, and so on.

2.3 Combined Sequence Kernel

Rather than computing a single similarity measure $K_n$, for a pair of sequences a combined similarity measure $K_N$ may be computed which incorporates a plurality of the similarity measures, each one computed for a different value of n, such as for n=2, n=3, and n=4. As previously noted, n represents a length of the subsequences of symbols shared by the two sequences of symbols.

In one embodiment, the individual similarity measures $K_n$ are each weighted in the combined similarity measure $K_N$ with a respective weight $\mu_n$. $K_N$ can then be computed as a linear combination of the plurality of similarity measures according to the expression:

$$K_N(s, t) = \sum_{n=1}^{N} \mu_n K_n(s, t)$$

where: $\mu_n$, n=1, . . . , N is a weight of the $n^{th}$ single-subsequence-length measure.

Additionally, a similarity measure can be obtained by normalizing any of the measures above to values between zero and one as:

$$\hat{K}(s, t) = \frac{K(s, t)}{\sqrt{K(s, s) K(t, t)}}$$

where K(s,s) and K(t,t) are the similarities of s with itself and of t with itself respectively and K(s,t) can be, for example, $K_n$ or $K_N$.

The kernel formulations outlined above, for example, in Eqn. (8) and Eqn. (14) are useful, in practice, because they allow the detection of similarity between sequences even when the two sequences do not have the same surface form, which is not possible using the classical word-sequence kernel. The weights $\{w_i\}$ i=1:p entering the kernel definition allow the control of the relative contribution of the factors in word matches. In one embodiment, three factors corresponding to the surface form, lemma form, and part of speech are given equal weight. In other embodiments, greater weight is accorded to one of the factors, such as the surface form.

As will be appreciated, the original word-sequence kernel (Eqn. (1)) is retrieved by simply setting the weight corresponding to the surface form factor to one, and all other weights to zero. Surprisingly, the soft matching kernel formulations outlined in Eqn. (8) and Eqn. (14) can be determined at almost no extra computational cost. Indeed, computing the original kernel Eqn. (1) for the pair of sequences s and t is $O(n|s||t|)$ (See, for example, Lodhi et al.). If the similarity between words of the sentences to be compared is known, computing the soft-matching version of the kernel is also $O(n|s||t|)$ (according to the principles outlined in Shawe-Taylor and Cristianini (J. Shawe-Taylor and N. Cristianini, *Kernel Methods for Pattern Analysis*, Cambridge University Press, 2004). In the present case, the word similarity measure is sentence-dependent, and prior to computing the factored kernel as a soft-matching sequence kernel, the word similarity for each pair of words from s and t may be pre-computed. This extra step is $O(p|s||t|)$, and it follows that the global complexity of the factored kernel is $O(n|s||t|+p|s||t|) \approx O((n+p)|s||t|)$.

Figure 4:
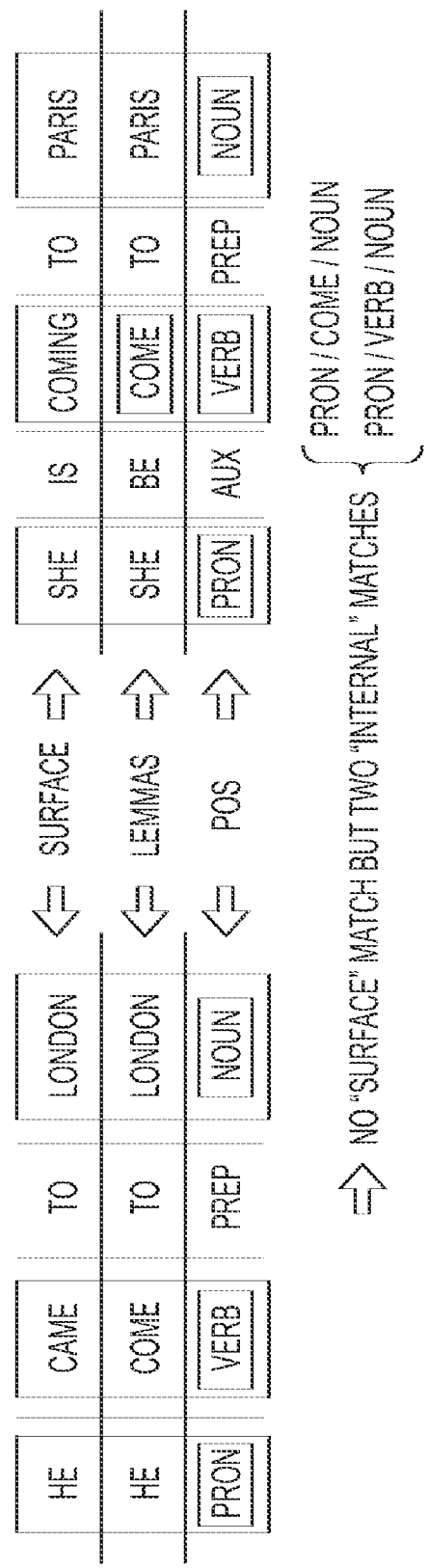
FIG. 4 illustrates the feature space mapping associated with a conventional kernel for N=3.

This construction is illustrated in FIG. 4 for a pair of subsequences whose composing symbols are enclosed in rectangles that have a related meaning but an empty intersection of surface words, and consequently a null similarity by the classical word-sequence kernel of Eqn. 1. In this example, the factored version of the kernel, together with the introduction of word lemmas and parts of speech, allows, in particular, the detection of similarities between the subsequences He/came/London and She/coming/Paris.

As can be seen from this example, the exemplary soft kernel is able to detect similarities that the original kernel cannot detect. Nor would the similarity be detected in a system in which each factor is considered as a separate tape.

Figure 5A:
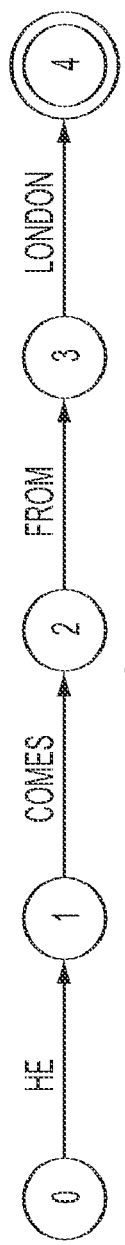
FIG. 5 illustrates the comparison between three sequence kernels: A represents a sequence as used in a conventional sequence kernel in which the surface form of each word of a subsequence must match for similarity to be found; B illustrates a sequence as used in a kernel in which a match can be found on any one of three possible tapes (factors): surface form, part of speech and lemma form; C illustrates a sequence in the exemplary sequence kernel in which a match can be found for any one of the factors for each word, such that an overall match can be arrived at by a combination of different matching factors.
Figure 5B:
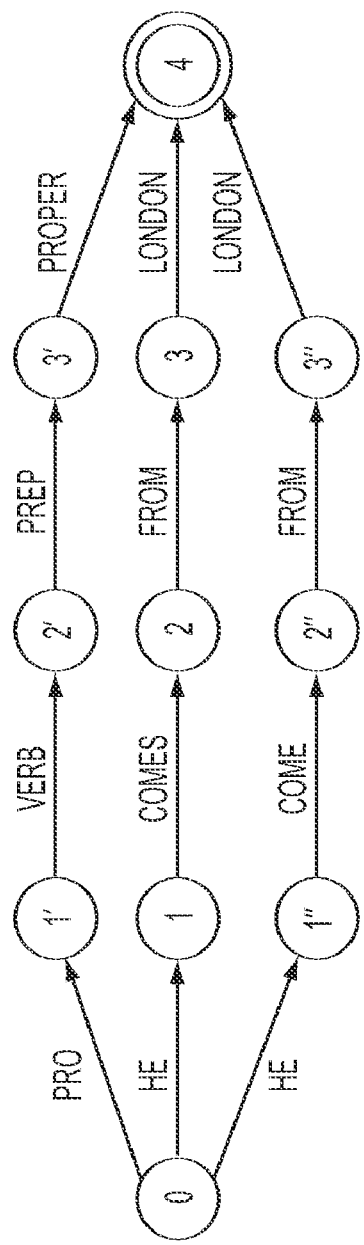
Figure 5C:
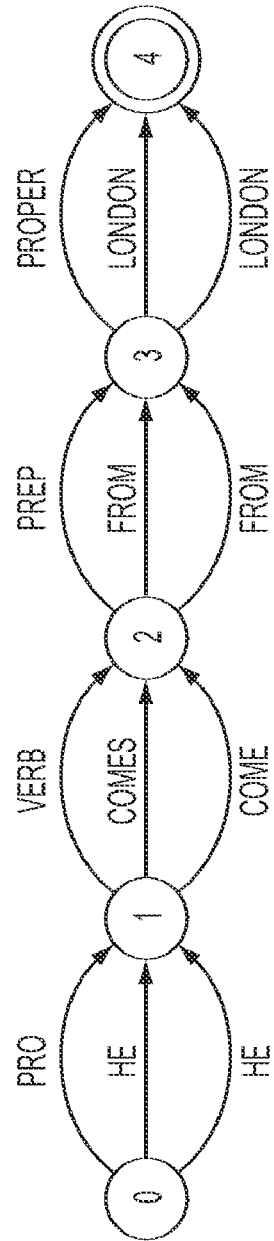
Figure 6:
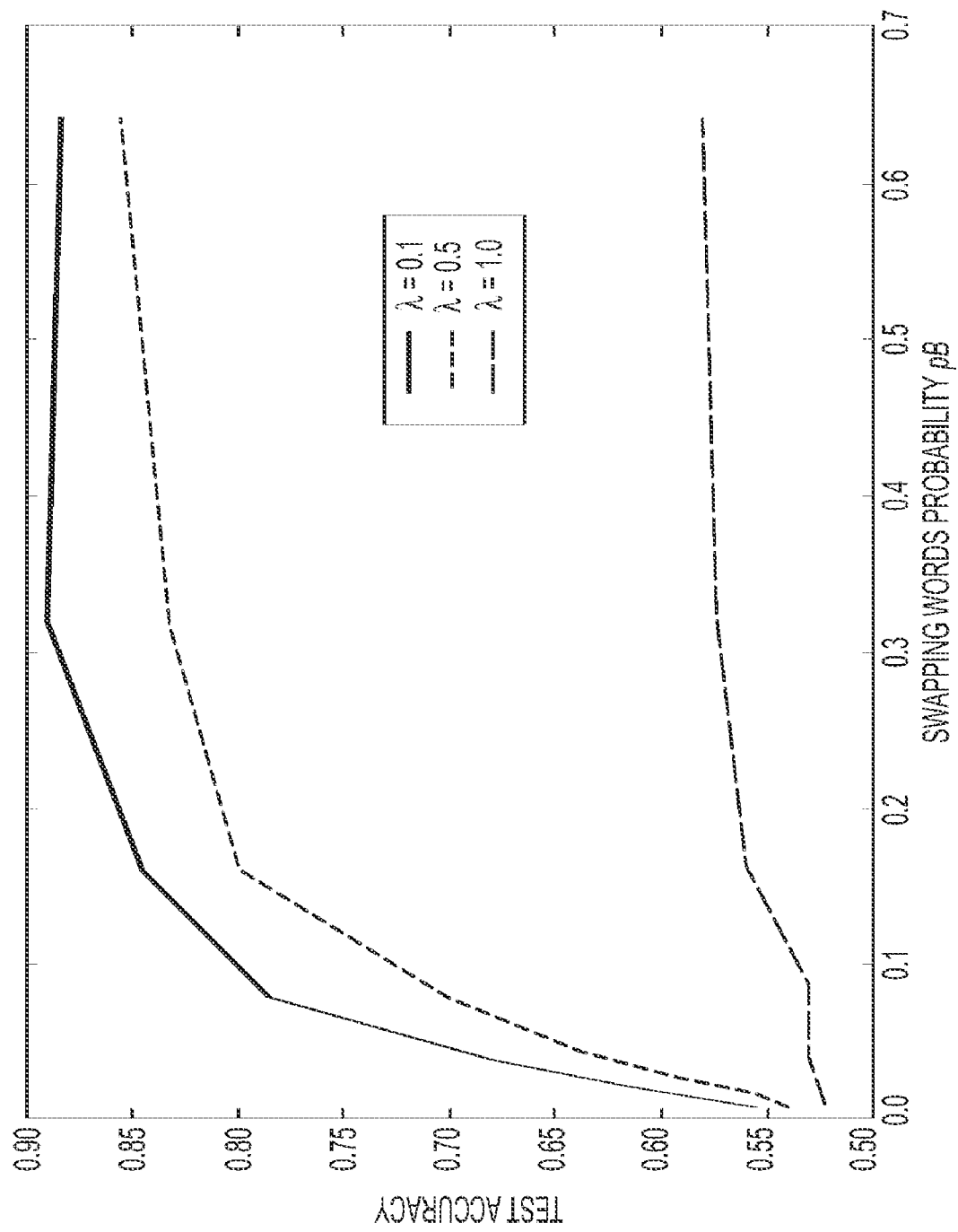
FIG. 6 illustrates test set accuracy as a function of the swapping words probability $p_B$ for a conventional word sequence kernel ($v_1=[1; 0; 0]$) based on a sequence representation analogous to FIG. 5A, at different values of $\lambda$ (a gap weighting parameter which penalizes gaps)
Figure 7:
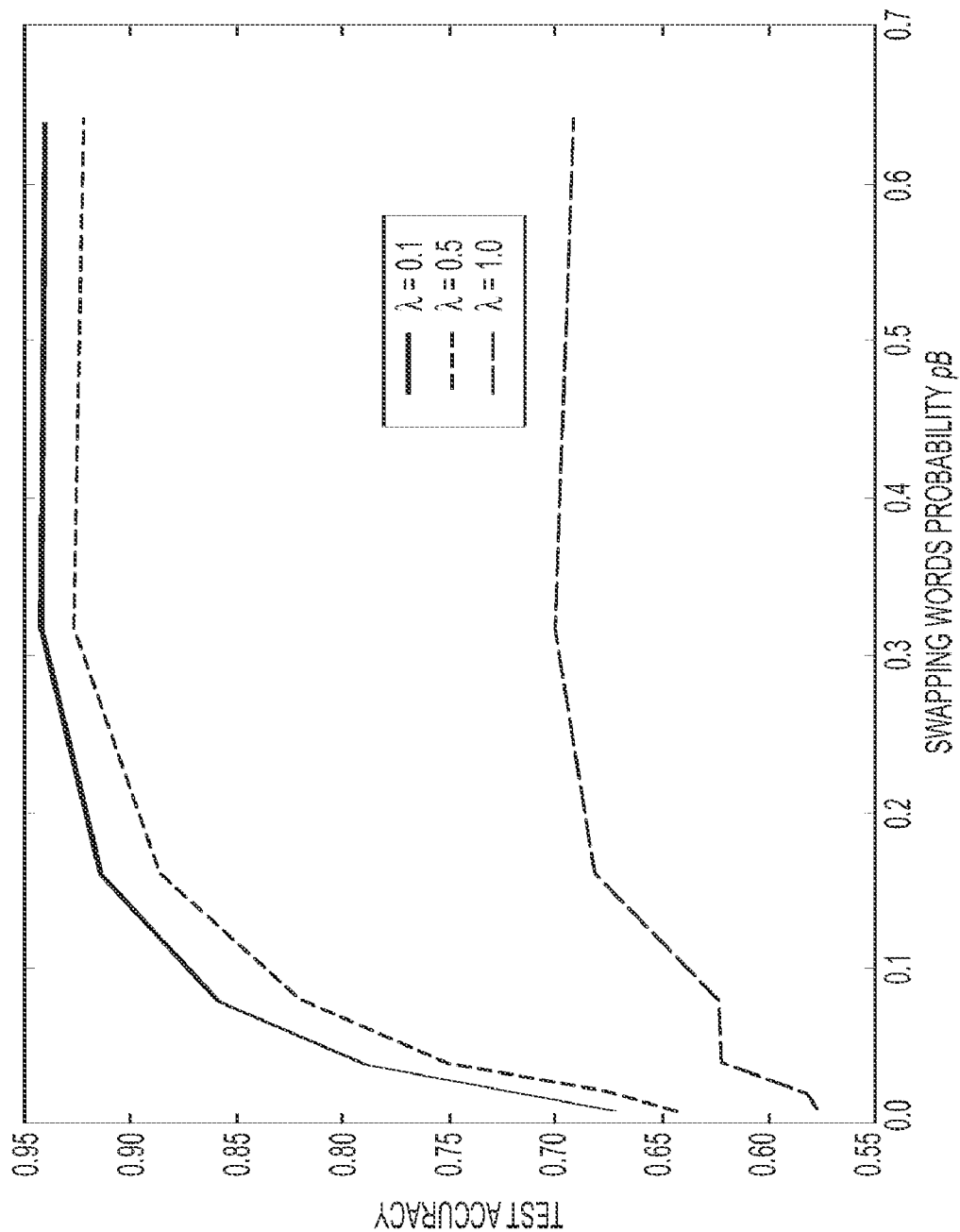
FIG. 7 illustrates test set accuracy for the same test set as FIG. 6 as a function of $p_B$ for a factored word sequence kernel in which factors are equally weighted ($v_2=[1; 1; 1]$), at different values of $\lambda$.
Figure 8:
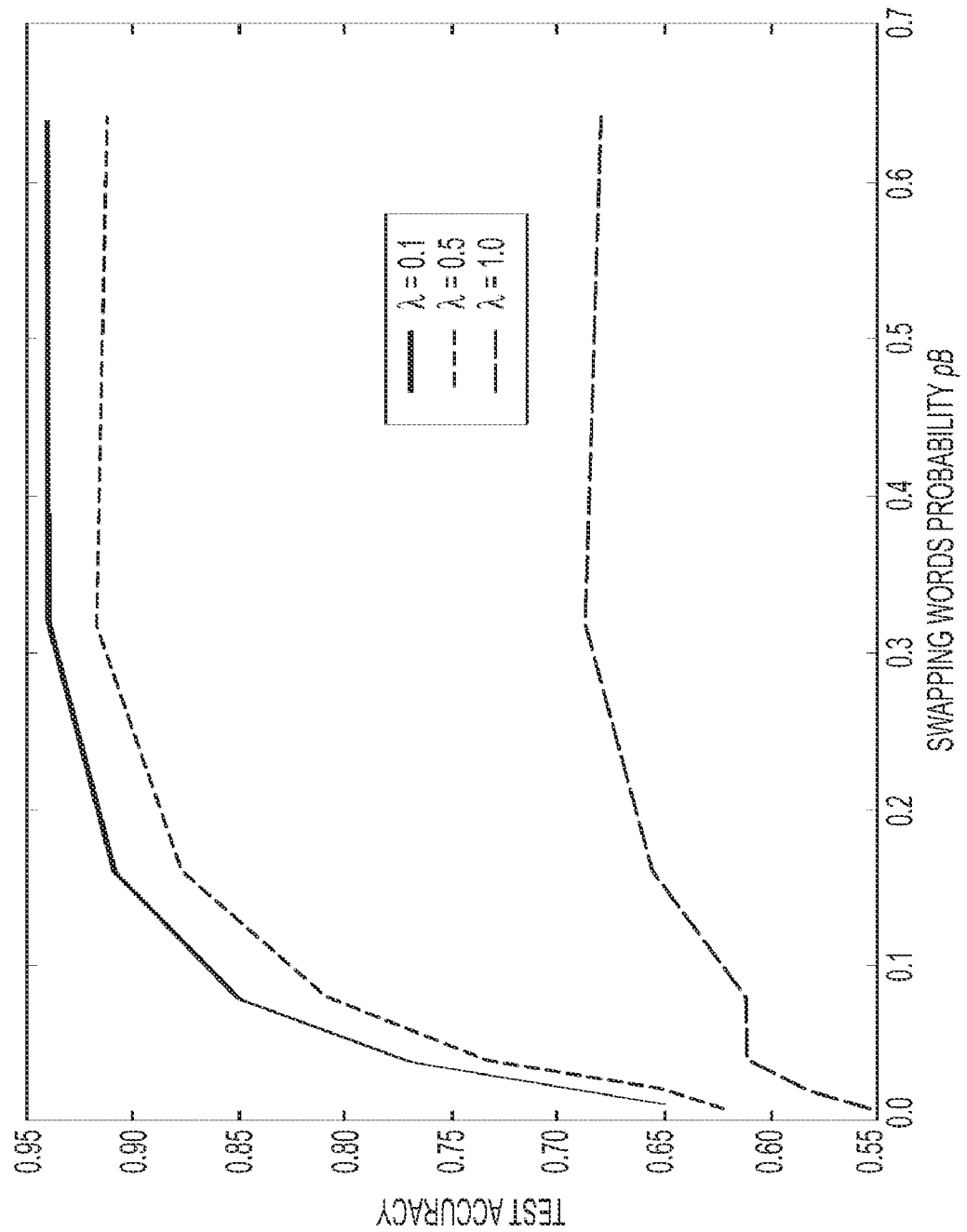
FIG. 8 illustrates test set accuracy for the same test set as FIG. 6 as a function of $p_B$ for a factored word sequence kernel in which factors are differently weighted ($v_3=[1; 0.5; 0.5]$), at different values of $\lambda$.
Figure 9:
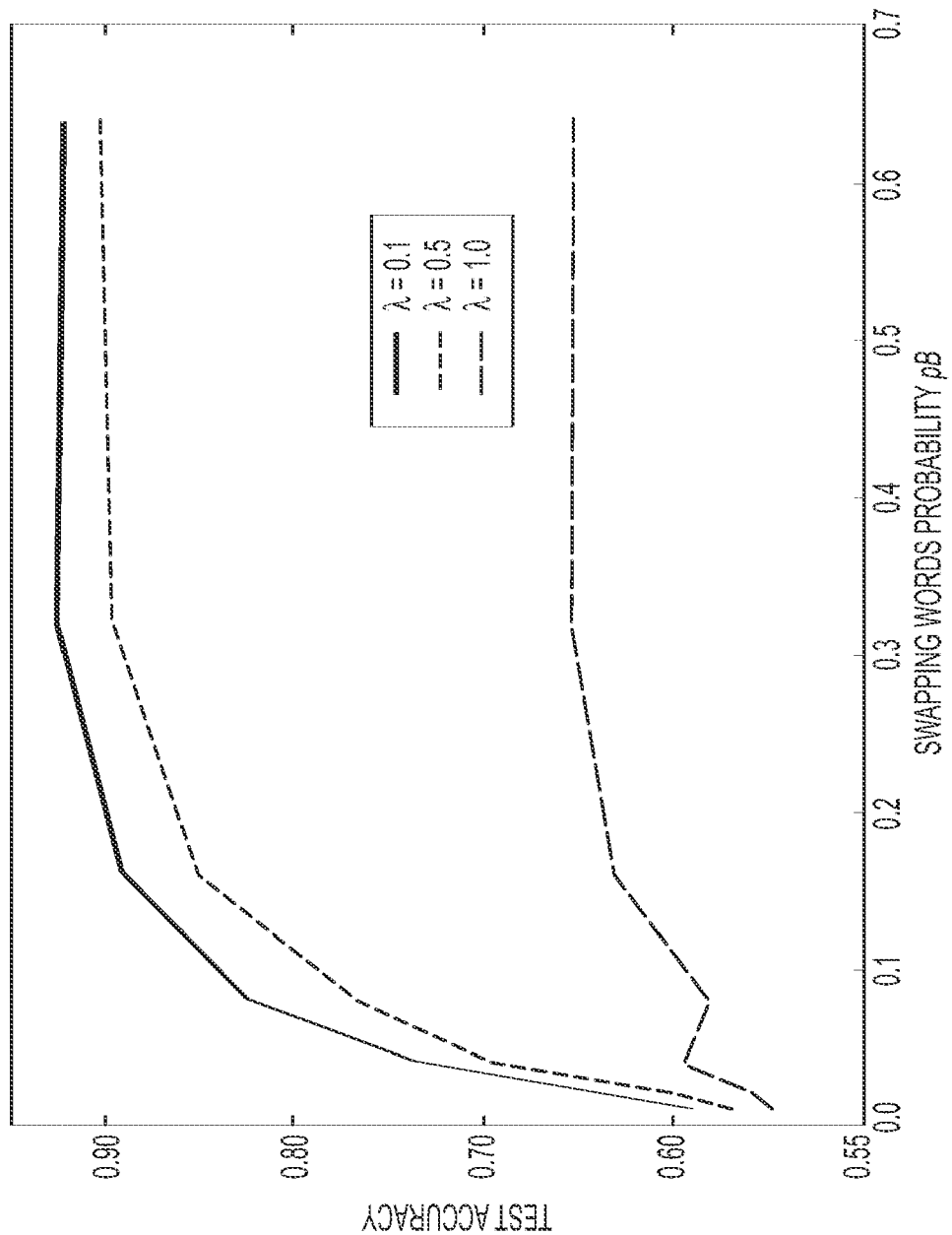
FIG. 9 illustrates test set accuracy for the same test set as FIG. 6 as a function of p for a factored word sequence kernel in which factors are all differently weighted ($v_4=[1; 0.5; 0.25]$), at different values of $\lambda$.

FIG. 5 compares the way in which three sequence kernels can find similarity. In A, a conventional sequence kernel uses only the surface form of each word of a subsequence, which must match for similarity to be found. In B, a match can be found on any one of three possible tapes (factors): surface form, part of speech and lemma form, but not on a combination. In C, a match can be found for any one of the factors for each word, such that an overall match can be arrived at by a combination of different matching factors, illustrating the exemplary sequence kernel.

3. Introduction Of Semantic Information To The Kernel

Section 2.1 covers the case in which the factors characterizing the words are discrete in nature. In another embodiment, the general formulation of Eqn. 8 can be adapted to consider any source of information. In the context of language modeling, and in particular, in the context of document categorization, one extension is to introduce a semantic component in the word similarity measure. In practice, this can help to refine the matching between words. A semantic factor or kernel which considers if two words are semantically related allows the kernel to serve as an improved similarity measure. The exemplary semantic factor considers parts of speech, thus providing an addition factor to the surface form and lemma form factors. Since semantic similarity measures can be also defined between words in different languages, this extension opens the door to cross-language applications including cross-language information retrieval, categorization, clustering, and filtering. The semantic kernel may include one or more of:

kernels derived from semantic networks such as WordNet.
kernels derived from latent semantic analysis.

In such cases however, some of the feature space interpretations of Sections 2.2 may be lost, since semantic kernels are typically not binary.

3.1 Semantic Kernels From Wordnet

A first option to define semantic kernels which can be used as a similarity measure between two words is to exploit semantic networks such as the WordNet database. Loosely speaking, WordNet is a semantic network organized as a graph where the nodes, called synsets, correspond to sets of synonyms, and connections between nodes correspond to hypernyms relations, that connect synsets to synsets referring to a broader concept. In practice, a word is often associated to several synsets, and, in one embodiment, a general method consists in defining a semantic kernel $k_{Sem}$ expressed for a pair of words (u, v) as:

$$k_{Sem}(u, v) = \sum_{\sigma \in S(u)} \sum_{\sigma \in S(v)} k_\sigma(s, t)$$

where S(u) is the set of synsets associated with the word u, S(v) is the set of synsets associated with the word v and $k_\sigma$ is a kernel between synsets.

As will be appreciated, the value of $k_{Sem}(u,v)$ can be input to Eqn. 7 in place of one or more of the similarity measures $k_h(u[h],v[h])$ For further details on synsets are to be found in F. Costa, S. Menchetti, A. Ceroni, A. Passerini, and P. Frasconi, "Decomposition kernels for natural language processing," in *Proceedings of the Workshop on Learning Structured Information in Natural Language Applications—EACL* (2006), hereinafter Costa et al. Several solutions can be considered to define the elementary kernel $k_\sigma$, such as:

1. $k_\sigma$ is a Kronecker delta function, in which case $k_{Sem}(u,v)$ corresponds to the number of synsets shared by the words u and v. See, for example, C. Giuliano, A. Gliozzo, and C. Strapparava, "Syntagmatic kernels: a word sense disambiguation case study," in *Proceedings of the workshop on Learning Structured Information in Natural Language Applications—EACL* (2006) (hereinafter Giuliano, et al.), for a description of the use of these functions.

2. A more complex definition is used for $k_\sigma$, based on the number of edges shared by the sets of paths connecting synsets from S(u) and S(v) to "root" synsets, that is, synsets corresponding to the most general concepts of the hierarchy. See for example, Costa, et al.

3. $k_\sigma$ may be based on similarities between synsets in the network, including the Dice coefficient or the Jaccard coefficient. See, for example, Shawe-Taylor and Cristianini. It is appreciated that in some of these cases $k_\sigma$ might not be positive definite, which implies that the global similarity measure will not be positive definite, and thus not a proper kernel, and will not be suitable for use in algorithms (such as e.g. the Support Vector Machine algorithm) requiring that the similarity measure is positive definite.

3.2 Latent Semantic Analysis

A latent semantic approach relies on an abstract representation for text spans, including individual words, and more precisely a common vector space where words from one or more languages can all be represented. This representation can be obtained by linear or non-linear statistical analysis techniques and, more specifically, dimensionality reduction methods with ad-hoc optimization criteria and constraints. See, for example Thomas K. Landauer, Peter W. Foltz, and Darrell Laham, "An introduction to latent semantic analysis," *Discourse Processes*, 25:259-284 (1998) and Shawe-Taylor and Cristianini for a fuller discussion about such approaches. For the purpose of the exemplary embodiment, it can be assumed that a latent semantic method of choice can provide us with a "latent semantic vector" $\vec{ls}(u)$ (and similarly for v) for every word in the text spans to be compared, so that this vector can be added to the set of factors representing each word. Any valid kernel operating in the latent semantic space, then, can be used in Eqn. 7 to take latent semantic information into account in the global similarity measure $K_n$.

Since some latent semantic approaches (notably Canonical Correlation Analysis and its kernel variant) provide a common space for more than one language, the possibility of computing sequence-based similarities in this space opens the door to applying factored word-sequence kernels in cross-language information retrieval, categorization and clustering problems.

Examples of the applications where the exemplary fwsk is applicable include text categorization, retrieval, clustering, filtering, automatic evaluation, and language modeling for both automatic speech recognition and statistical machine translation.

In one specific embodiment, the fwsk disclosed herein are used in a Pseudo-relevance feedback document retrieval system. In this approach, a query is first input in a natural language. A small set of highly ranked documents is retrieved according to some measure of similarity with the query, e.g., matching words, phrases, etc. The set of highly ranked documents is then used to retrieve further documents. In this latter step, one or more sequence kernels (fwsk) are computed between each of the highly ranked documents (after appropriate enrichment with linguistic information) and a larger set of documents. Based on the computed fwsks, some of the documents in the larger set of documents may additionally be returned to the user as being responsive to the query.

4. Case When Some Factors Are Strings

Whenever a factor is itself naturally represented as a string of characters (as is the case for word surface forms and lemmas, for instance, but not for POS, the labels for which can be totally arbitrary) and it makes sense to consider that two tokens are similar if the strings in this factor are similar (e.g. "Gorbatchev" and "Gorbaciov" in alternative transcriptions from the Russian Cyrillic alphabet), then an appropriate decreasing function of an edit distance between the strings can be used to assess the similarity between the two factors.

A specific edit distance that could be used is the Levenshtein distance, that we indicate as $l([h],v[h])$. A specific decreasing function that would be suitable in this case could be the negative exponential:

$$k_h(u[h],v[h])=e^{-l(u[h],v[h])}$$

It is appreciated that, depending on the selected edit distance and function used, $k_h$ could be non positive definite and possibly non symmetric, in which case the overall similarity would not be a proper kernel function, and would not be suitable for use in algorithms (such as e.g. the Support Vector Machine algorithm) requiring that the similarity measure is symmetric and positive definite.

Without intending to limit the scope of the exemplary embodiment, the following examples demonstrate the effectiveness of the exemplary method employing a factored word-sequence kernel as compared with other methods of computing similarity between spans of text.

5. EXAMPLE

Experiments were conducted on a simple problem: discriminating "good" and "bad" sentences. A training set of 5000 English sentences is extracted from the Europarl corpus. This corpus includes sentences taken from the proceedings of the European parliament and, for purposes of this example, are considered to represent "good" sentences. Half of these sentences are kept as such: they constitute the "good" sentences. The other half of the training set is randomly perturbed to create "bad" sentences: according to a parameter $p_B$ taken in $\{0.01; 0.02, 0.04, 0.08, 0.16, 0.32, 0.64\}$, such that each word of a sentence is swapped with the one preceding it in the (original) sentence with probability $p_B$. The bigger $p_B$, the more pairs of words are swapped, and consequently, the less typical are the sentences and the easier is the problem. A (soft-margin) support vector machine model is optimized and trained on the training set, and subsequently used to predict a test set of 2000 sentences randomly perturbed in the same way.

The factored word sequence kernel (Eqn. 8) offers many degrees of freedom for parameterization. The configuration adopted for this Example uses the following values:

The length n of the subsequences taken into account in the kernel is systematically set to 2.

The gap penalization factor A is taken in $\{0.1; 0.5, 1\}$. Note that when A tends to zero, the gaps are more and more penalized and the kernel reduces to counting the number of common contiguous subsequences. On the other hand, when λ tends to one, gaps are not penalized, and every subsequence detected has the same influence in the kernel.

A set of three factors is used to characterize a word: its surface form, its lemma and its part-of-speech. In this example, 4 different vectors W are used which give the following weights $[w_1, w_2, w_3]$ to the three factors, surface form, lemma form, and part-of-speech:

$W_1=[1; 0; 0]$, which corresponds to the classical word-sequence kernel involving surface forms of words only (i.e., Eqn 1).

$W_2=[1; 1; 1]$, which gives the same weight to every possible composite subsequences.

$W_3=[1; 0.5; 0.5]$, which has the effect of penalizing composite subsequences involving lemmas and POS.

$W_4=[1; 0.5; 0.25]$, which penalizes even further POS features in composite subsequences, this vector tests the theory that that POS may provide less reliable information.

Results are presented in FIGS. 6-11. FIGS. 6-9 show plots for the different vectors $W_1$-$W_4$, all at the same value of n, for different values of gap penalization λ. The test accuracy, on a scale of 0-1 represents the number of sentences correctly identified as being good/bad. Each of the curves suggests that improved results are obtained at the lowest λ, which suggests that tolerating gaps is not beneficial to the kernel for this particular task. A different result may be obtained for a different corpus.

Figure 10:
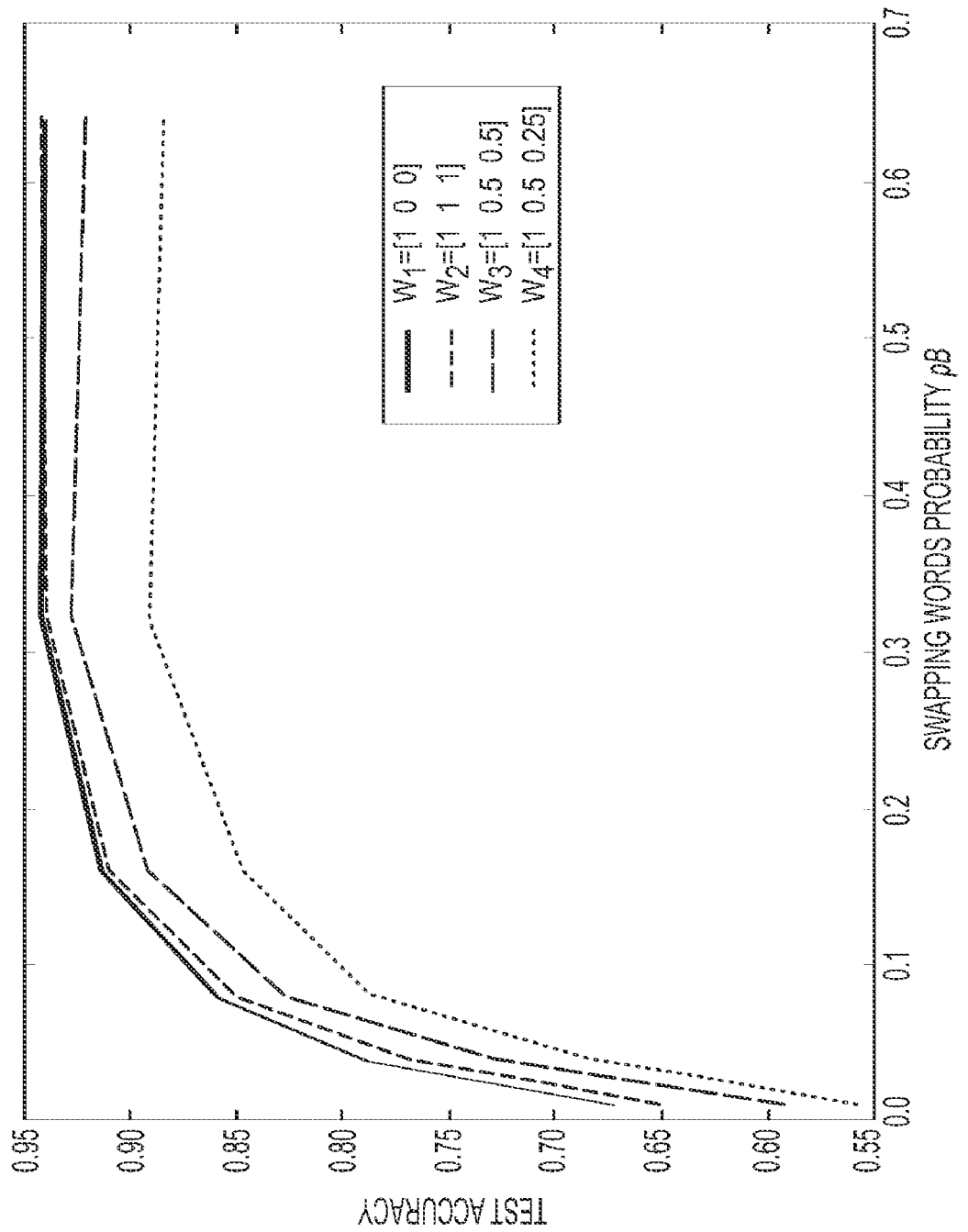
FIG. 10 illustrates test set accuracy for the same test set as FIGS. 6-9 as a function of $p_B$ for the factored word sequence kernels using weighting vectors $v_1$-$v_4$ at the same value of $\lambda$.

FIG. 10 uses the same data to illustrate the test accuracy at the same value of λ=0.1, for the 4 vectors of weights considered, when n=2. These curves show that whatever the probability of swapping words is, the factored word sequence kernel can significantly improve the performance of the original word-sequence kernel of Eqn (1), which corresponds to the curve obtained for $W_1$=[1; 0; 0]. In this particular example, the greater that the features involving lemmas and POS are penalized, relative to the surface form, the less significant are the improvements. This may due to the fact that this penalization renders the kernel matrix more and more diagonal.

Figure 11:
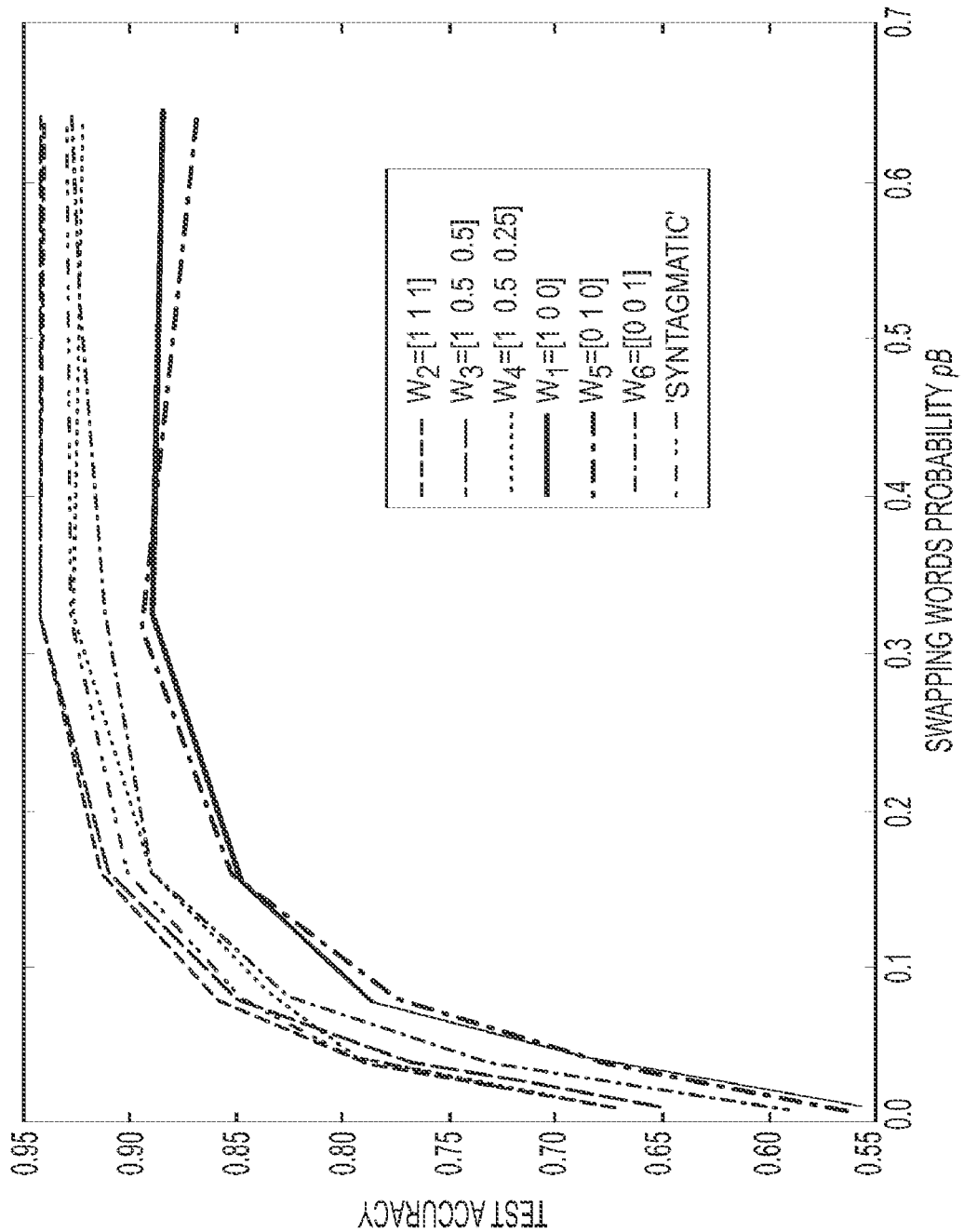
FIG. 11 adds to FIG. 10, two plots for weighting vectors ($v_5=[0; 1; 0]$); ($v_6=[0; 0; 1]$) and a plot for a syntagmatic kernel based on a sequence representation analogous to that illustrated in FIG. 5B, in which the respective kernels computed for $v_1$, $v_5$, and $v_6$ are averaged.

FIG. 11 adds additional plots to that of FIG. 10 to illustrate the accuracy obtained with kernels using weighting vectors as follows:

$W_5$=[0; 1; 0], i.e., only taking into consideration lemma matching; and $W_6$=[0; 0; 1], i.e., only taking into consideration POS matching;

results obtained with a syntagmatic kernel (a simple sum of kernel functions operating on the different factors). The syntagmatic kernel is similar to that used in Giuliano, A. Gliozzo, and C. Strapparava. Syntagmatic kernels: a word sense disambiguation case study. In *Proceedings of the workshop on Learning Structured Information in Natural Language Applications—EACL,* 2006.

As can be seen from FIG. 11, kernels operating only on surface forms (i.e., $W_1=[1; 0; 0]$) and lemmas (i.e., $W_5=[0; 1; 0]$) respectively, lead to almost equivalent results. This may be because English is a language of a limited inflection. As a result, lemmas and surface forms are often equivalent. Thus, for English, a kernel which uses only one of these two factors may be adequate for many purposes. Sequence kernels operating on part of speech only (i.e., $W_6=[0; 0; 1]$), lead to significant better results than kernels operating on surface forms or lemmas only. This suggests that for short sequences, POS tags alone may be sufficient to identify grammatically incorrect sentences.

While the simple integration scheme consisting in summing kernels operating on the different factors (syntagmatic kernel) can improve the classification performance obtained with single factors, overall better results can be obtained with the factored kernel when it is correctly parameterized.

To provide a comparison between the syntagmatic kernel, and the present fwsk, let $\{\Sigma_h\}h=1:p$ consisting here of surface forms and parts of speech. It is then easy to see that the feature space related to the syntagmatic kernel is indexed by the alphabet $$\bigcup_{h=1}^{p} \Sigma_h^n$$

while it is indexed by $$\left(\bigcup_{h=1}^{p} \Sigma_h\right)^n$$

in the exemplary fwsk formulation. In other words, while the syntagmatic kernel considers several sources of information to characterize words, their integration in the kernel is disconnected. On the other hand, the factored kernel formulation enables a combination of these sources of information to design "composite" subsequences defined by different factors. Moreover, even though the computational cost of the factored kernel is slightly greater than that of the original sequence kernel (Eqn. 1), only a single kernel matrix needs to be computed, while the computation of the syntagmatic kernel basically multiplies the computational cost of the original kernel by the number of word modalities considered (that is, by 2 in the method of Giuliano et al., but more generally by p). In particular, the computational cost of the method using the exemplary fwsk is $O((n+p)|s||t|)$ while for the syntagmatic kernel is $O(np|s\backslash\backslash t\backslash)$.

The experimental results demonstrate (in the case of telling good sentences from bad sentences with correct words in the wrong order), the superiority of the exemplary factored word-sequence kernel (fwsk) over more standard kernel constructions and data integration schemes. The problem of telling good sentences from bad ones is a problem directly inspired by the problem of guiding a machine translation system towards producing fluent sentences and thus the experimental results demonstrate the effectiveness of the exemplary fwsk for these applications.

To summarize, there are disclosed herein an apparatus and a method for computing the similarity between two text spans, a sub-problem which is at the very heart of many applications. This method leverages independently extracted information about the words in the text spans, including: factors selected from the group consisting of:

Word surface forms,
word lemmas,
parts-of-speech,
morphological information such as one or more of case, gender, number, tense, mood, transitivity, and synonym-type clustering,
semantic information as encoded in semantic networks such as WordNet,
latent semantic information as automatically extracted through the statistical analysis of a corpus.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of comparing spans of text comprising:
    with a computer, computing a similarity measure between a first sequence of symbols representing a first text span and a second sequence of symbols representing a second text span as a function of the occurrences of optionally noncontiguous subsequences of symbols shared by the two sequences of symbols, wherein each of the symbols comprises at least one consecutive word, the words being enriched with linguistic information allowing them to be defined according to a set of linguistic factors, whereby pairs of symbols in the first and second sequences forming a shared subsequence of symbols are each matched according to at least one of the factors and wherein all pairs of matching symbols in a shared subsequence need not match according to the same factor.

2. The method of claim 1, further comprising, prior to the computing, processing at least one of the first and second text spans to generate a sequence of tokens and enriching the tokens with linguistic information to form the first and second sequences of symbols.

3. The method of claim 1, wherein the computing a similarity measure comprises computing at least one factored word sequence kernel.

4. The method of claim 3, wherein in the factored word sequence kernel, gaps in the shared subsequences are weighted with a decay factor.

5. The method of claim 3, wherein the factored word sequence kernel has the general form:

$$K_n(s,t) = \sum_{I,J} \lambda^{l(I)+l(J)} \prod_{k=1}^{n} A(s_{i_k}, t_{j_k})$$

where:
S and t represent the first and second sequences;
n represents a length of the shared subsequences to be used in the computation;

I and J represent two of the subsequences of size n of indices ranging on the positions of the symbols in s and t respectively;

λ represents an optional decay factor which weights gaps in non-contiguous sequences;

l (I) represents the length, as the number of symbols plus any gaps, spanned by the subsequence I in s;

l (J) represents the length, as the number of symbols plus any gaps, spanned by the subsequence J in t, respectively; and $A(s_{i_k}, t_{j_k})$ is a function of two symbols $s_{i_k}, t_{j_k}$ in the sequences s and t respectively, the function quantifying the similarity between the two symbols according to the set of factors.

6. The method of claim 5, wherein the function $A(s_{i_k}, t_{j_k})$ is a weighted sum over factors of the similarity between factors in each pair of symbols according to the expression:

$$A(u, v) = \sum_{h=1}^{p} w_h^2 k_h(u[h], v[h])$$

where:
u and v are two symbols to be compared, represented each by p factors;

$w_h^2, h=1, \ldots, p$ are the weights of the individual terms in the linear combination;

$k_h(u[h], v[h])$ is a function measuring the similarity between the $h^{th}$ factor of u and the $h^{th}$ factor of v.

7. The method of claim 3, wherein the factored word sequence kernel has the general form:

$$K_n(s, t) = \sum_{I,J} \lambda^{l(I)+l(J)} \prod_{k=1}^{n} \left( \sum_{h=1}^{p} w_h^2 k_h(s_{i_k}[h], t_{j_k}[h]) \right)$$

where
S and t represent the first and second sequences;
n represents a length of the shared subsequences to be used in the computation;

I and J represent two of the subsequences of size n of indices ranging on the positions of the symbols in s and t respectively;

λ represents an optional decay factor which weights gaps in non-contiguous sequences;

l(I) represents the length, as the number of symbols plus any gaps, spanned by the subsequence I in s;

l(J) represents the length, as the number of symbols plus any gaps, spanned by the subsequence J in t, respectively;

$W_h$ represents the weight of each factor in a set of h factors; and $k_h$ represents the similarity score between two symbols $s_{i_k}$ and $t_{j_k}$ of sequences s and t, respectively, for a given factor h.

8. The method of claim 1, wherein the factored word sequence kernel weights at least one of the factors differently from another of the factors.

9. The method of claim 1, wherein a plurality of the factors are selected from the group consisting of surface forms, lemmas, parts-of-speech, and morphological tags.

10. The method of claim 1 wherein there are at least three factors.

11. The method of claim 1, wherein at least one factor comprises elements of a continuous inner-product space and the similarity is computed as the inner product between the factor elements.

12. The method of claim 1, wherein at least one factor comprises real vectors forming latent-semantic representations of symbols.

13. The method of claim 1, wherein the computing of the similarity measure comprises computing a plurality of similarity measures each of the similarity measures being computed for a different value of n and computing a combined similarity measure as a function of the computed similarity measures, where n represents a length of the subsequences of symbols shared by the two sequences of symbols.

14. The method of claim 13, wherein the combined similarity measure is computed as a linear combination of the plurality of similarity measures according to the expression:

$$K_N(s, t) = \sum_{n=1}^{N} \mu_n K_n(s, t)$$

where:
$\mu_n, n=1, \ldots, N$ is a weight of the $n^{th}$ single-subsequence-length measure.

15. The method of claim 1, wherein at least one of the factors comprises elements of a countable set and the similarity of two symbols in a pair of symbols, one in each subsequence, is computed using the Kronecker delta function.

16. The method of claim 1, wherein at least one of the factors comprises strings of characters and their similarity is computed as a decreasing function of the edit distance between the two strings.

17. The method of claim 1, wherein at least one of the factors comprises sets of symbols and their similarity is computed using a set-similarity measure such as the Dice coefficient or the Jaccard coefficient.

18. The method of claim 1, wherein at least one of the factors comprises sets of synonym sets from a thesaurus.

19. The method of claim 1, wherein the second sequence comprises a set of second sequences and the method comprises, for each of the second sequences, computing of the similarity measure between the first sequence of symbols and the second sequence of symbols as a function of the occurrences of optionally noncontiguous subsequences of symbols shared by the two sequences of symbols, the method further comprising evaluating a fluency of the first text span in a natural language shared by the text sequences based on the computed similarity measures.

20. The method of claim 19, wherein the set of second sequences comprises a set of good sequences determined to have good fluency and a set of bad sequences determined to have a poor fluency.

21. The method of claim 1 wherein the text spans comprise sentences in the same natural language.

22. A computer program product comprising a non-transitory computer-readable recording medium on which instructions are recorded, which when executed by a computer, perform a method comprising:

computing a similarity measure between a first sequence of symbols representing a first text span and a second sequence of symbols representing a second text span as a function of the occurrences of optionally noncontiguous subsequences of symbols shared by the two sequences of symbols, wherein each of the symbols comprises at least one consecutive word, the words being enriched with linguistic information allowing them to be defined according to a set of linguistic factors, whereby pairs of symbols in the first and second sequences forming a shared subsequence of symbols are each matched according to at least one of the factors and wherein all pairs of matching symbols in a shared subsequence need not match according to the same factor.

23. An apparatus for computing a similarity measure between sequences of symbols in which each symbol is defined in terms of a plurality of factors, the apparatus comprising memory which stores instructions and a processing component which executes the instructions, comprising:

a linguistic processor which takes as input a text span and enriches tokens of the text span with linguistic information to form a first sequence of symbols, each of the symbols comprising an enriched token; and a sequence kernel computation unit which takes as input the first sequence of symbols and computes a similarity measure between the first sequence of symbols and a second sequence of symbols as a function of the occurrences of optionally noncontiguous subsequences of symbols shared by the first and second sequences of symbols, whereby pairs of symbols in shared subsequences of symbols shared by the first and second sequences are independently each matched according any one or more of the factors based on the linguistic information.

24. A method of computing a similarity measure between sequences of symbols in which each symbol is defined in terms of a plurality of factors comprising:

computing a sequence kernel in which optionally non-contiguous subsequences of the first and second sequences are compared, the kernel having the general form:

$$K_n(s, t) = \sum_{I,J} \lambda^{l(I)+l(J)} \prod_{k=1}^{n} A(s_{i_k}, t_{j_k})$$

where:

S and t represent the first and second sequences;

n represents a length of the shared subsequences to be used in the computation;

I and J represent two of the subsequences of size n of indices ranging on the positions of the symbols in s and t respectively;

$\lambda$ represents an optional decay factor which weights gaps in non-contiguous sequences;

l (I) represents the length, as the number of symbols plus any gaps, spanned by the subsequence I in s;

l (J) represents the length, as the number of symbols plus any gaps, spanned by the subsequence J in t, respectively;

$A(s_{i_k}, t_{j_k})$ is a function of two symbols $s_{i_k}$, $t_{j_k}$ in the sequences s and t respectively, the function quantifying the similarity between the two symbols according to the set of factors.

* * * * *